United States Patent
Hamamoto et al.

(10) Patent No.: US 10,000,107 B2
(45) Date of Patent: Jun. 19, 2018

(54) VEHICLE AIR CONDITIONER

(71) Applicants: JAPAN CLIMATE SYSTEMS CORPORATION, Hiroshima (JP); Panasonic Corporation, Osaka (JP)

(72) Inventors: Hiroshi Hamamoto, Hiroshima (JP); Kohei Fukawatase, Hiroshima (JP); Yoshihiko Otake, Hiroshima (JP); Kou Komori, Nara (JP); Subaru Matsumoto, Tochigi (JP); Katsuyoshi Wakano, Tokyo (JP); Mio Furui, Osaka (JP); Norihiro Miyamura, Hyogo (JP)

(73) Assignees: JAPAN CLIMATE SYSTEMS CORPORATION, Hiroshima (JP); Panasonic Corporation, Osaka (JP)

( * ) Notice: Subject to any disclaimer, the term of this patent is extended or adjusted under 35 U.S.C. 154(b) by 254 days.

(21) Appl. No.: 14/869,426

(22) Filed: Sep. 29, 2015

(65) Prior Publication Data

US 2016/0016459 A1    Jan. 21, 2016

Related U.S. Application Data

(63) Continuation of application No. PCT/JP2014/001189, filed on Mar. 4, 2014.

(30) Foreign Application Priority Data

Mar. 29, 2013  (JP) .................................. 2013-071875
Mar. 29, 2013  (JP) .................................. 2013-071887

(51) Int. Cl.
*F25B 29/00*     (2006.01)
*B60H 1/32*      (2006.01)
*B60H 1/00*      (2006.01)

(52) U.S. Cl.
CPC ....... *B60H 1/3205* (2013.01); *B60H 1/00007* (2013.01); *B60H 1/00921* (2013.01)

(58) Field of Classification Search
CPC .............. B60H 1/3205; B60H 1/00007; B60H 1/00921
See application file for complete search history.

(56) References Cited

U.S. PATENT DOCUMENTS 5,493,870 A  *  2/1996  Kodama ............ B60H 1/00907
                                                62/155
2004/0079096 A1* 4/2004  Itoh ................... B60H 1/00735
                                                62/223

(Continued)

FOREIGN PATENT DOCUMENTS

JP    H08216664 A   *  8/1996
JP    9-240266 A       9/1997

(Continued)

OTHER PUBLICATIONS

Aoki, Air Conditioner for Vehicle, Feb. 12, 2010, JP2010030435A, Whole Document.*

(Continued)

*Primary Examiner* — Larry Furdge
(74) *Attorney, Agent, or Firm* — Studebaker & Brackett PC

(57) ABSTRACT

A heat pump device 20 is operated so as to make a switch between multiple operation modes including a first dehumidification and heating operation mode in which a refrigerant discharged from a compressor is circulated through a downstream interior heat exchanger 31, a first pressure reducing valve 52, an upstream interior heat exchanger 32, and an exterior heat exchanger 33 in this order so that the heat exchanger 31 functions as a radiator and the heat exchanger 32 functions as a heat absorber, and a second dehumidification and heating operation mode in which the (Continued)

refrigerant discharged from the compressor is circulated through the downstream interior heat exchanger 31, a second pressure reducing valve 53, the exterior heat exchanger 33, and the upstream interior heat exchanger 32 in this order so that the heat exchanger 31 functions as a radiator and the heat exchanger 32 functions as a heat absorber.

6 Claims, 19 Drawing Sheets

(56) References Cited

U.S. PATENT DOCUMENTS

| | | |
|---|---|---|
| 2010/0326127 A1 | 12/2010 | Oomura et al. |
| 2012/0255319 A1 | 10/2012 | Itoh et al. |
| 2013/0019615 A1 | 1/2013 | Choi et al. |
| 2013/0291577 A1 | 11/2013 | Miyakoshi et al. |

FOREIGN PATENT DOCUMENTS

| | | | |
|---|---|---|---|
| JP | 2010030435 A | * | 2/2010 |
| JP | 2010-111222 A | | 5/2010 |
| JP | 2010234847 A | * | 10/2010 |
| JP | 2011-005983 A | | 1/2011 |
| JP | 2011-255735 A | | 12/2011 |
| JP | 2011240725 A | * | 12/2011 |
| JP | 2012-81870 A | | 4/2012 |
| JP | 2012-176660 A | | 9/2012 |
| JP | 2013-056670 A | | 3/2013 |

OTHER PUBLICATIONS

Kurahashi et al., Air Conditioning and Dehumidification Control Device in Heat Pump for Electric Vehicle, Aug. 27, 1996, JPH08216664A, Whole Document.*

Matsubara et al., Air Conditioner for Vehicle, Oct. 21, 2010, JP2010234847A, Whole Document.*

Ogasawara et al., Air Conditioning Device for Vehicle, Dec. 1, 2011, JP2011240725A, Whole Document.*

International Search Report issued in PCT/JP2014/001189, dated Jun. 3, 2014.

Written Opinion issued in PCT/JP2014/001189, dated Jun. 3, 2014.

* cited by examiner

FIRST FROST REDUCING
OPERATION MODE

SECOND FROST REDUCING
OPERATION MODE

VEHICLE AIR CONDITIONER

CROSS-REFERENCE TO RELATED APPLICATIONS

This is a continuation of International Application No. PCT/JP2014/001189 filed on Mar. 4, 2014, which claims priority to Japanese Patent Application No. 2013-071875 filed on Mar. 29, 2013 and Japanese Patent Application No. 2013-071887 filed on Mar. 29, 2013. The entire disclosures of these applications are hereby incorporated by reference.

BACKGROUND

The present invention relates to a vehicle air conditioner to be mounted on a vehicle, and more particularly relates to an air conditioner with a heat pump device.

An air conditioner with a heat pump device has been known in the art as an air conditioner to be mounted on hybrid vehicles, electric vehicles and other kinds of vehicles. A heat pump device for use in each of those vehicles is formed by connecting together an electric compressor, an exterior heat exchanger provided outside the vehicle cabin, a pressure reducing valve, and an interior heat exchanger provided inside the vehicle cabin in this order via refrigerant piping (see, for example, Japanese Unexamined Patent Publication No. 2011-5983).

When the heat pump device operates in a heating operation mode, the refrigerant is allowed to flow so that the interior heat exchanger functions as a radiator and the exterior heat exchanger functions as a heat absorber. On the other hand, when the heat pump device operates in a cooling operation mode, the refrigerant is allowed to flow so that the interior heat exchanger functions as a heat absorber and the exterior heat exchanger functions as a radiator.

Meanwhile, a vehicle air conditioner as disclosed in Japanese Unexamined Patent Publication No. 2011-255735, for example, includes an upstream interior heat exchanger provided upstream in the airflow direction and a downstream interior heat exchanger provided downstream in that direction. Its refrigerant piping includes a four-way valve. By turning this four-way valve, a switch is made between multiple operation modes such as a heating operation mode and a cooling operation mode.

As another example, a vehicle air conditioner as disclosed in Japanese Unexamined Patent Publication No. H09-240266 includes, as interior heat exchangers, an upstream interior heat exchanger provided upstream in the airflow direction and a downstream interior heat exchanger provided downstream in that direction. The downstream interior heat exchanger functions as a radiator in both of heating and cooling operation modes, while the upstream interior heat exchanger functions as a heat absorber in both of the heating and cooling operation modes.

Considering various possible situations in which the vehicle cabin needs to be air-conditioned, a so-called "dehumidification and heating operation" of heating the vehicle cabin while decreasing the humidity thereof sometimes needs to be performed. When the dehumidification and heating operation is performed, however, the interior environment may vary depending on some external factor. For example, if the humidity is low (e.g., when the outdoor air temperature is low), only a low dehumidifying capacity is needed. On the other hand, if the humidity is high (e.g., when the outdoor air temperature is relatively high), a high dehumidifying capacity is needed. Since the dehumidifying capacity is controllable by adjusting the pressure and temperature of the refrigerant supplied to the interior heat exchanger, a low-temperature refrigerant may be supplied to the interior heat exchanger to achieve a high dehumidifying capacity.

Nevertheless, while the dehumidification and heating operation is performed, a heating capacity is required. That is why a sufficiently high heating capacity could not be achieved simply by supplying a low-temperature refrigerant uniformly to the interior heat exchanger in order to increase the dehumidifying capacity.

In view of the foregoing background, it is therefore an object of the present invention to allow for controlling the dehumidifying capacity appropriately while achieving a sufficiently high heating capacity during the dehumidification and heating operation.

Also, while the dehumidification and heating operation is performed, the condensate in the interior heat exchanger gets frozen to cause frosting there. Once frosting has occurred, the interior heat exchanger is no longer able to exchange heat, and therefore, a frost reducing operation needs to be performed. However, the frosting reducing operation may sometimes make the occupant uncomfortable. That is why if the dehumidification and heating operation mode needs to be switched between multiple modes as described above, people want to perform the frost reducing operation efficiently in each of those operation modes.

It is therefore another object of the present invention to allow for performing the frost reducing operation efficiently when the heat pump device is operated at a dehumidifying capacity corresponding to the required degree of dehumidification.

SUMMARY

To achieve these objects, according to a first aspect of the present invention, a refrigerant discharged from a compressor is supplied to an interior heat exchanger located downstream in the airflow direction of the air-conditioning air to make the downstream heat exchanger function as a radiator, and the refrigerant that has flowed out of the downstream heat exchanger has its pressure reduced and then is supplied to an interior heat exchanger located upstream in the airflow direction to make the upstream heat exchanger function as a heat absorber.

A first aspect of the present invention is a vehicle air conditioner comprising:

a heat pump device including a compressor that compresses a refrigerant, a first interior heat exchanger provided inside a vehicle cabin, a second interior heat exchanger provided inside the vehicle cabin and upstream of the first interior heat exchanger in an airflow direction, an exterior heat exchanger provided outside the vehicle cabin, and first and second pressure reducing valves, the heat pump device being formed by connecting together the compressor, the first and second interior heat exchangers, the pressure reducing valves and the exterior heat exchanger via refrigerant piping;

an interior air-conditioning unit which houses the first and second interior heat exchangers and which includes a blower that blows air-conditioning air to the first and second interior heat exchangers, the interior air-conditioning unit being configured to produce conditioned air and supply the conditioned air into the vehicle cabin; and an air-conditioning controller configured to control the heat pump device and the interior air-conditioning unit.

In the vehicle air conditioner, the air-conditioning controller makes the heat pump device operate while making a switch between multiple operation modes including a first dehumidification and heating operation mode in which a refrigerant discharged from the compressor is circulated through the first interior heat exchanger, the first pressure reducing valve, the second interior heat exchanger, and the exterior heat exchanger in this order so that the first interior heat exchanger functions as a radiator and the second interior heat exchanger functions as a heat absorber, and a second dehumidification and heating operation mode in which the refrigerant discharged from the compressor is circulated through the first interior heat exchanger, the second pressure reducing valve, the exterior heat exchanger, and the second interior heat exchanger in this order so that the first interior heat exchanger functions as a radiator and the second interior heat exchanger functions as a heat absorber.

According to this configuration, during the first dehumidification and heating operation mode, a high-temperature, high-pressure refrigerant discharged from a compressor is supplied to a first interior heat exchanger to make the first interior heat exchanger function as a radiator. On the other hand, a refrigerant which has had its pressure reduced by a first pressure reducing valve is supplied to a second interior heat exchanger to make the second interior heat exchanger function as a heat absorber. The second interior heat exchanger is arranged upstream in the airflow direction in the interior air-conditioning unit and the first interior heat exchanger is arranged downstream of the second interior heat exchanger. Thus, the air that has been dehumidified by the second interior heat exchanger is heated by the first interior heat exchanger and then supplied to the vehicle cabin. In this manner, a dehumidification and heating operation is carried out.

Likewise, during the second dehumidification and heating operation mode, the first interior heat exchanger also functions as a radiator and the second interior heat exchanger also functions as a heat absorber. However, since the second interior heat exchanger is supplied with a refrigerant that has circulated through the exterior heat exchanger, the second interior heat exchanger comes to have a lower evaporating pressure than the exterior heat exchanger does. Thus, a larger quantity of heat is absorbed than in the first dehumidification and heating operation mode. As a result, in the second dehumidification and heating operation mode, the dehumidifying capacity becomes higher than in the first dehumidification and heating operation mode.

Meanwhile, in both of the first and second dehumidification and heating operation modes, the high-temperature, high-pressure refrigerant discharged from the compressor is supplied to the first interior heat exchanger, which is arranged downstream in the airflow direction. This thus allows for heating sufficiently the air-conditioning air that has been dehumidified by the second interior heat exchanger and achieving a high heating capacity.

A second aspect of the present invention is an embodiment of the first aspect of the present invention. In the second aspect, the vehicle air conditioner includes a frost deposition detecting means for detecting deposition of frost in the exterior heat exchanger.

When the frost deposition detecting means senses that frost has been deposited in the exterior heat exchanger, the air-conditioning controller switches the operation modes of the heat pump device into a defrosting and dehumidification operation mode in which the refrigerant discharged from the compressor is circulated through the first interior heat exchanger, the first pressure reducing valve, and the second interior heat exchanger in this order while bypassing the exterior heat exchanger.

Specifically, the outdoor air temperature is not so low in the dehumidification and heating operation mode as in a heating operation mode, for example. That is why by blocking the flow of the refrigerant to the exterior heat exchanger when frost is deposited in the exterior heat exchanger, the frost in the exterior heat exchanger is melted with reliability by using the outdoor air.

Optionally, according to another method, when frost is deposited in the exterior heat exchanger, the frost in the exterior heat exchanger may be melted by supplying the high-temperature, high-pressure refrigerant discharged from the compressor to the exterior heat exchanger. In that case, the temperature of the refrigerant supplied to the first interior heat exchanger may decrease so much as to cause a decrease in the temperature of the air-conditioning air to be supplied to the vehicle cabin. According to the present invention, however, the high-temperature, high-pressure refrigerant discharged from the compressor is supplied to the first interior heat exchanger, thus minimizing a decrease in the temperature of the air-conditioning air. Consequently, occupant's comfortableness is not impaired.

In addition, this configuration allows for melting the frost in the exterior heat exchanger reliably without using any additional heat source such as an electric heater (e.g., a PTC heater). Consequently, just a little energy is dissipated.

A third aspect of the present invention is an embodiment of the first or second aspect of the present invention. In the third aspect, the first pressure reducing valve is configured to have the ability to reduce pressure to varying degrees and provided for a pipe connected to a refrigerant inlet side of the second interior heat exchanger, and the second pressure reducing valve is configured to have the ability to reduce pressure to varying degrees and provided for a pipe connected to a refrigerant inlet side of the exterior heat exchanger.

This configuration allows for regulating the pressure of the refrigerant flowing into the second interior heat exchanger into an intermediate pressure during the first dehumidification and heating operation mode and regulating the pressure of the refrigerant flowing into the exterior heat exchanger into an intermediate pressure during the second dehumidification and heating operation mode.

A fourth aspect of the present invention is an embodiment of the third aspect of the present invention. In the fourth aspect, the first and second pressure reducing valves are controlled by the air-conditioning controller, and the air-conditioning controller is configured to regulate an operating pressure of the second interior heat exchanger by adjusting the degree of reduction in pressure at the first pressure reducing valve during the first dehumidification and heating operation mode, and to regulate an operating pressure of the exterior heat exchanger by adjusting the degree of reduction in pressure at the second pressure reducing valve during the second dehumidification and heating operation mode.

This configuration allows for setting the operating pressure of the second interior heat exchanger to be an intermediate pressure during the first dehumidification and heating operation mode and also setting the operating pressure of the exterior heat exchanger to be an intermediate pressure during the second dehumidification and heating operation mode.

A fifth aspect of the present invention is an embodiment of the fourth aspect of the present invention. In the fifth aspect, the vehicle air conditioner includes a temperature detecting means for detecting a temperature of the second interior heat exchanger downstream in the airflow direction.

The air-conditioning controller is configured to control the first and second pressure reducing valves based on the temperature of the second interior heat exchanger that has been detected by the temperature detecting means downstream in the airflow direction.

According to this configuration, the lower the temperature of the second interior heat exchanger downstream in the airflow direction, the greater the degree of dehumidification caused by the second interior heat exchanger. This thus allows for setting the operating pressures of the second interior heat exchanger and exterior heat exchanger to be an intermediate pressure by controlling the first and second pressure reducing valves properly according to the degree of dehumidification.

A sixth aspect of the present invention is an embodiment of any one of the first to fifth aspects of the present invention. In the sixth aspect, the interior air-conditioning unit is configured to have a plurality of blowout modes including a defroster blowout mode in which conditioning air is blown to a windshield inside the vehicle cabin, and the air conditioner comprises a blowout mode detecting means for determining whether or not the interior air-conditioning unit is operating in the defroster blowout mode, and if the blowout mode detecting means has sensed the interior air-conditioning unit operating in the defroster blowout mode, the air-conditioning controller makes the heat pump device operate in the second dehumidification and heating operation mode.

According to this configuration, if the defroster blowout mode is selected, it is highly probable that the windshield should be defogged. Thus, switching the operation modes into the second dehumidification and heating operation mode, which achieves a higher dehumidifying capacity, allows for defogged the windshield quickly.

To achieve the objects described above, a seventh aspect of the present invention allows for reducing frost efficiently by controlling the pressure reducing valves.

A seventh aspect of the present invention is a vehicle air conditioner comprising:

a heat pump device including a compressor that compresses a refrigerant, a first interior heat exchanger provided inside a vehicle cabin, a second interior heat exchanger provided inside the vehicle cabin and upstream of the first interior heat exchanger in an airflow direction, an exterior heat exchanger provided outside the vehicle cabin, and a first pressure reducing valve with the ability to reduce pressure to varying degrees, the heat pump device being formed by connecting together the compressor, the first and second interior heat exchangers, the pressure reducing valve and the exterior heat exchanger via refrigerant piping;

an interior air-conditioning unit which houses the first and second interior heat exchangers and which includes a blower that blows air-conditioning air to the first and second interior heat exchangers, the interior air-conditioning unit being configured to produce conditioned air and supply the conditioned air into the vehicle cabin; and an air-conditioning controller configured to control the heat pump device and the interior air-conditioning unit.

The first pressure reducing valve is provided for a pipe connected to a refrigerant inlet side of the second interior heat exchanger, the first pressure reducing valve is controlled by the air-conditioning controller, and the air-conditioning controller makes the heat pump device operate while making a switch between multiple operation modes including a first dehumidification and heating operation mode in which the first interior heat exchanger functions as a radiator and the second interior heat exchanger functions as a heat absorber, and a first frost reducing operation mode in which the second interior heat exchanger has its frost reduced during the first dehumidification and heating operation mode, the first pressure reducing valve being controlled so that a temperature of the refrigerant flowing into the second interior heat exchanger rises during the first frost reducing operation mode compared to during the first dehumidification and heating operation mode.

This configuration allows for increasing the temperature of the refrigerant flowing into the second interior heat exchanger by controlling the first pressure reducing valve during the first dehumidification and heating operation mode, thus reducing frost in the second interior heat exchanger efficiently during the first frost reducing operation mode.

An eighth aspect of the present invention is a vehicle air conditioner comprising:

a heat pump device including a compressor that compresses a refrigerant, a first interior heat exchanger provided inside a vehicle cabin, a second interior heat exchanger provided inside the vehicle cabin and upstream of the first interior heat exchanger in an airflow direction, an exterior heat exchanger provided outside the vehicle cabin, and a second pressure reducing valve with the ability to reduce pressure to varying degrees, the heat pump device being formed by connecting together the compressor, the first and second interior heat exchangers, the pressure reducing valve and the exterior heat exchanger via refrigerant piping;

an interior air-conditioning unit which houses the first and second interior heat exchangers and which includes a blower that blows air-conditioning air to the first and second interior heat exchangers, the interior air-conditioning unit being configured to produce conditioned air and supply the conditioned air into the vehicle cabin; and an air-conditioning controller configured to control the heat pump device and the interior air-conditioning unit.

The second pressure reducing valve is provided for a pipe connected to a refrigerant inlet side of the exterior heat exchanger, the second pressure reducing valve is controlled by the air-conditioning controller, and the air-conditioning controller makes the heat pump device operate while making a switch between multiple operation modes including a second dehumidification and heating operation mode in which the first interior heat exchanger functions as a radiator and the second interior heat exchanger functions as a heat absorber and in which the quantity of heat absorbed by the second interior heat exchanger is increased compared to the quantity of heat absorbed during the first dehumidification and heating operation mode, and a second frost reducing operation mode in which the second interior heat exchanger has its frost reduced during the second dehumidification and heating operation mode, the second pressure reducing valve being controlled so that the exterior heat exchanger absorbs heat with a temperature of the refrigerant flowing into the exterior heat exchanger decreased during the second frost reducing operation mode compared to during the second dehumidification and heating operation mode.

This configuration allows for absorbing heat into the exterior heat exchanger by controlling the second pressure reducing valve during the second dehumidification and heating operation mode, thus reducing frost in the second interior heat exchanger efficiently during the second frost reducing operation mode.

A ninth aspect of the present invention is an embodiment of the seventh aspect of the present invention. In the ninth aspect, the air-conditioning controller includes, as the operation modes, a second dehumidification and heating operation mode in which the first interior heat exchanger functions as a radiator and the second interior heat exchanger functions as a heat absorber and in which the quantity of heat absorbed by the second interior heat exchanger is increased compared to the quantity of heat absorbed during the first dehumidification and heating operation mode, and a second frost reducing operation mode in which the second interior heat exchanger has its frost reduced during the second dehumidification and heating operation mode, the second pressure reducing valve being controlled so that the exterior heat exchanger absorbs heat with a temperature of the refrigerant flowing into the exterior heat exchanger decreased during the second frost reducing operation mode compared to during the second dehumidification and heating operation mode.

This configuration allows for absorbing a larger quantity of heat into the second interior heat exchanger during the second dehumidification and heating operation mode than during the first dehumidification and heating operation mode, thus achieving a powerful dehumidification and heating operation. This thus allows the heat pump device to operate with its dehumidifying capacity adjusted according to the degree of dehumidification required.

In addition, during the second dehumidification and heating operation mode, the second interior heat exchanger has its frost reduced through the second frost reducing mode of operation. This thus allows for reducing frost efficiently by performing an appropriate frost reducing operation in each of the first and second dehumidification and heating operation modes.

A tenth aspect of the present invention is an embodiment of any one of the seventh to ninth aspects of the present invention. In the tenth aspect, the air-conditioning controller makes the heat pump device operate with the operation modes switched into a third frost reducing operation mode in which the refrigerant is allowed to flow while bypassing the second interior heat exchanger.

According to this configuration, no refrigerant flows through the second interior heat exchanger during the third frost reducing operation mode, thus allowing for reducing frost in the second interior heat exchanger using the air-conditioning air blown by the blower against the second interior heat exchanger.

In addition, since no refrigerant flows through the second interior heat exchanger, frosting is reduced gently enough to avoid raising the humidity steeply inside the vehicle cabin. As a result, comfortableness is maintained.

An eleventh aspect of the present invention is an embodiment of the tenth aspect of the present invention. In the eleventh aspect, the vehicle air conditioner includes a frosting determination means for determining whether or not the second interior heat exchanger needs a frost reducing operation.

The air-conditioning controller is configured to switch the operation modes of the heat pump device into the third frost reducing operation mode and makes the heat pump device perform the third frost reducing operation for a predetermined amount of time, if the frosting determination means has decided that the second interior heat exchanger needs a frost reducing operation, to switch the operation modes into the first frost reducing operation mode if the frosting determination means has decided thereafter that the second interior heat exchanger still needs the frost reducing operation and if the operation mode just before the operation modes were switched into the third frost reducing operation mode was the first dehumidification and heating operation mode, and to switch the operation modes into the second frost reducing operation mode if the operation mode just before the operation modes were switched into the third frost reducing operation mode was the second dehumidification and heating operation mode.

According to this configuration, if a frost reducing operation needs to be performed on the second interior heat exchanger, first of all, a third frost reducing mode of operation is performed in which the refrigerant is allowed to flow while bypassing the second interior heat exchanger, which allows for reducing frost gently. As a result, the comfortableness is maintained with no steep rise in humidity caused inside the vehicle cabin.

If a frost reducing operation needs to be further performed on the second interior heat exchanger after that, a more powerful frost reducing operation is performed continuously with the operation modes switched into the first or second frost reducing operation mode according to the previous dehumidification and heating operation mode. As a result, the second interior heat exchanger has its frost reduced.

According to the first aspect of the present invention, the heat pump device is allowed to switch between multiple operation modes including a first dehumidification and heating operation mode in which a refrigerant discharged from the compressor is circulated through the first interior heat exchanger, the first pressure reducing valve, the second interior heat exchanger, and the exterior heat exchanger in this order so that the first interior heat exchanger functions as a radiator and the second interior heat exchanger functions as a heat absorber, and a second dehumidification and heating operation mode in which the refrigerant discharged from the compressor is circulated through the first interior heat exchanger, the second pressure reducing valve, the exterior heat exchanger, and the second interior heat exchanger in this order so that the first interior heat exchanger functions as a radiator and the second interior heat exchanger functions as a heat absorber. This allows for controlling the dehumidifying capacity appropriately while ensuring a sufficient heating capacity during the dehumidification and heating operation mode.

According to the second aspect of the present invention, if frost has been deposited in the exterior heat exchanger, the refrigerant discharged from the compressor is allowed to flow while bypassing the exterior heat exchanger, thus allowing for melting the frost in the exterior heat exchanger efficiently.

According to the third aspect of the present invention, the first pressure reducing valve is provided for a pipe connected to a refrigerant inlet side of the second interior heat exchanger, and the second pressure reducing valve is provided for a pipe connected to a refrigerant inlet side of the exterior heat exchanger. This thus allows for causing the refrigerant in the second interior heat exchanger to have an intermediate pressure during the first dehumidification and heating operation mode and causing the refrigerant in the exterior heat exchanger to have an intermediate pressure during the second dehumidification and heating operation mode. Consequently, the dehumidifying capacity is controllable finely.

The fourth aspect of the present invention allows for regulating the operating pressures of the second interior heat exchanger and exterior heat exchanger by adjusting the degrees of reduction in pressure at the first and second pressure reducing valves. Consequently, the dehumidifying capacity is controllable finely.

The fifth aspect of the present invention allows for controlling the first and second pressure reducing valves based on the temperature of a portion of the second interior heat exchanger downstream in the airflow direction. Consequently, the dehumidifying capacity is controllable accurately according to the current degree of dehumidification.

According to the sixth aspect of the present invention, if the interior air-conditioning unit is operating in the defroster blowout mode, the heat pump device is made to operate in the second dehumidification and heating operation mode, thus allowing for defogging the windshield quickly.

According to the seventh aspect of the present invention, during the first dehumidification and heating operation mode, the temperature of the refrigerant flowing into the second interior heat exchanger is allowed to be raised by controlling the first pressure reducing valve. This thus allows for reducing frost in the second interior heat exchanger efficiently during the first frost reducing operation mode.

According to the eighth aspect of the present invention, during the second dehumidification and heating operation mode, the exterior heat exchanger is allowed to absorb heat by controlling the second pressure reducing valve. This thus allows for reducing frost in the second interior heat exchanger efficiently during the second frost reducing operation mode.

According to the ninth aspect of the present invention, first and second dehumidification and heating operation modes are set to have mutually different dehumidifying capacities. A first frost reducing mode of operation is performed during the first dehumidification and heating operation mode, while a second frost reducing mode of operation, which is different from the first frost reducing mode of operation, is performed during the second dehumidification and heating operation mode. This thus allows for performing a frost reducing operation efficiently when the heat pump device is operated with its dehumidifying capacity controlled according to the degree of dehumidification required.

According to the tenth aspect of the present invention, a third frost reducing mode of operation is performed in which the refrigerant is allowed to flow while bypassing the second interior heat exchanger, thus allowing for reducing frost in the second interior heat exchanger while maintaining comfortableness without steeply raising the humidity inside the vehicle cabin.

According to the eleventh aspect of the present invention, when a frost reducing operation needs to be performed on the second interior heat exchanger, a third frost reducing mode of operation is performed in which the refrigerant is allowed to flow while bypassing the second interior heat exchanger, thus allowing for reducing frost in the second interior heat exchanger while maintaining comfortableness without steeply raising the humidity inside the vehicle cabin. If a frost reducing operation needs to be further performed after that, a more powerful frost reducing mode of operation may be performed continuously according to the previous dehumidification and heating operation mode. This ensures that the second interior heat exchanger has its frost reduced successfully.

DETAILED DESCRIPTION

Embodiments of the present invention will now be described in detail with reference to the accompanying drawings. Note that the following description of preferred embodiments is only an example in nature and is not intended to limit the scope, applications or use of the invention.

Figure 1:
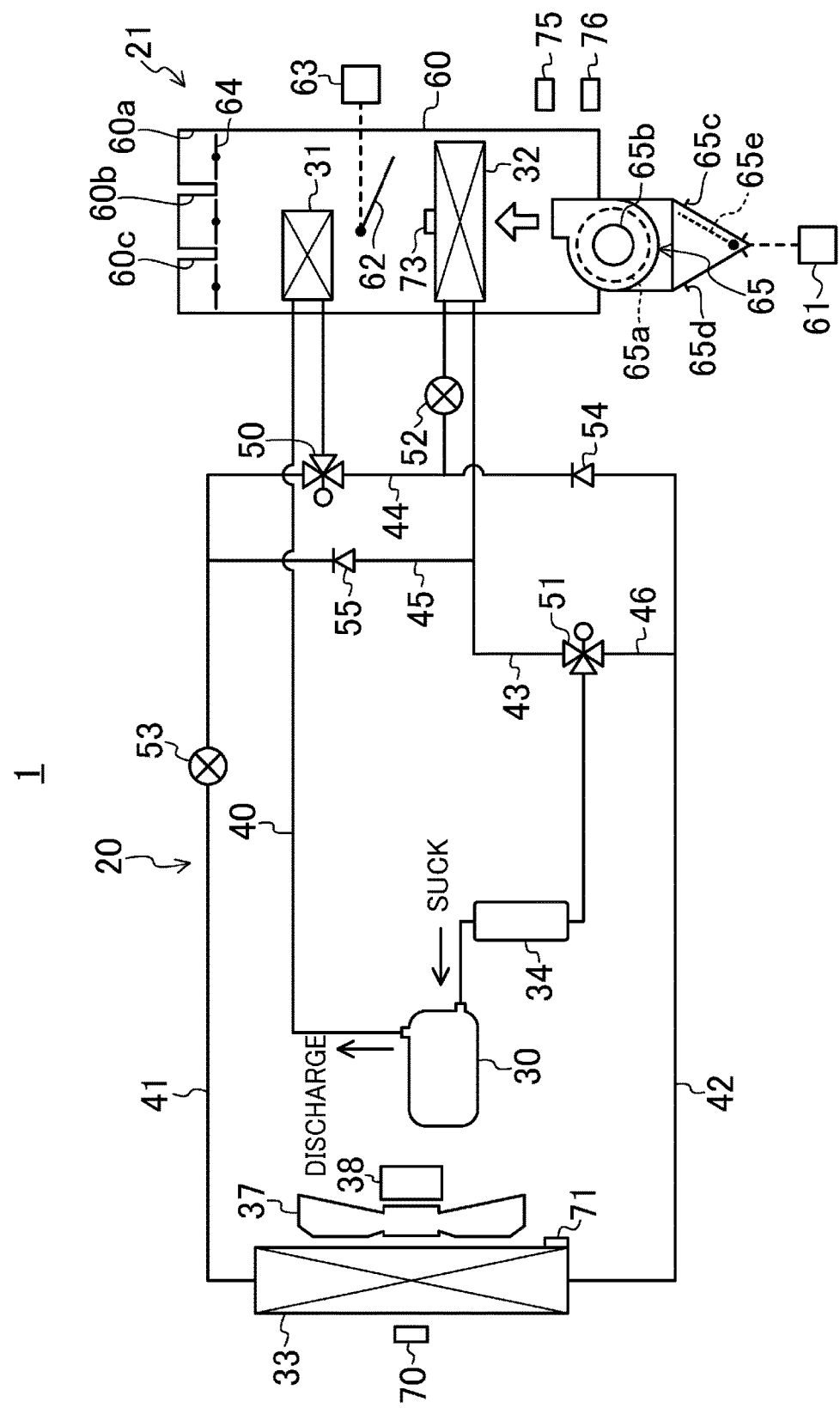
FIG. 1 generally illustrates a configuration for a vehicle air conditioner according to an embodiment.

FIG. 1 generally illustrates a configuration for a vehicle air conditioner 1 according to an embodiment of the present invention. A vehicle on which the vehicle air conditioner 1 is mounted may be an electric vehicle including a traction storage battery and a traction motor.

This vehicle air conditioner 1 includes a heat pump device 20, an interior air-conditioning unit 21, and an air-conditioning controller 22 (shown in FIG. 2) to control the heat pump device 20 and the interior air-conditioning unit 21.

The heat pump device 20 includes: a motor-driven compressor 30 that compresses a refrigerant; a downstream interior heat exchanger (first interior heat exchanger) 31 provided inside the vehicle cabin; an upstream interior heat exchanger (second interior heat exchanger) 32 provided upstream of the downstream interior heat exchanger 31 in an airflow direction inside the vehicle cabin; an exterior heat exchanger 33 provided outside the vehicle cabin; an accumulator 34; and first to fourth main refrigerant pipes 40 to 43 and first to third branch refrigerant pipes 44 to 46 which connect all of these members 30 to 34 together.

The motor-driven compressor 30 is an onboard compressor which has been known in the art, and is driven by an electric motor. The discharge rate per unit time is variable by changing the number of revolutions of the motor-driven compressor 30. The motor-driven compressor 30 is connected to an air-conditioning controller 22 so as to have its ON/OFF states switched and its number of revolutions controlled. The motor-driven compressor 30 is supplied with power from the traction storage battery.

Figure 3:
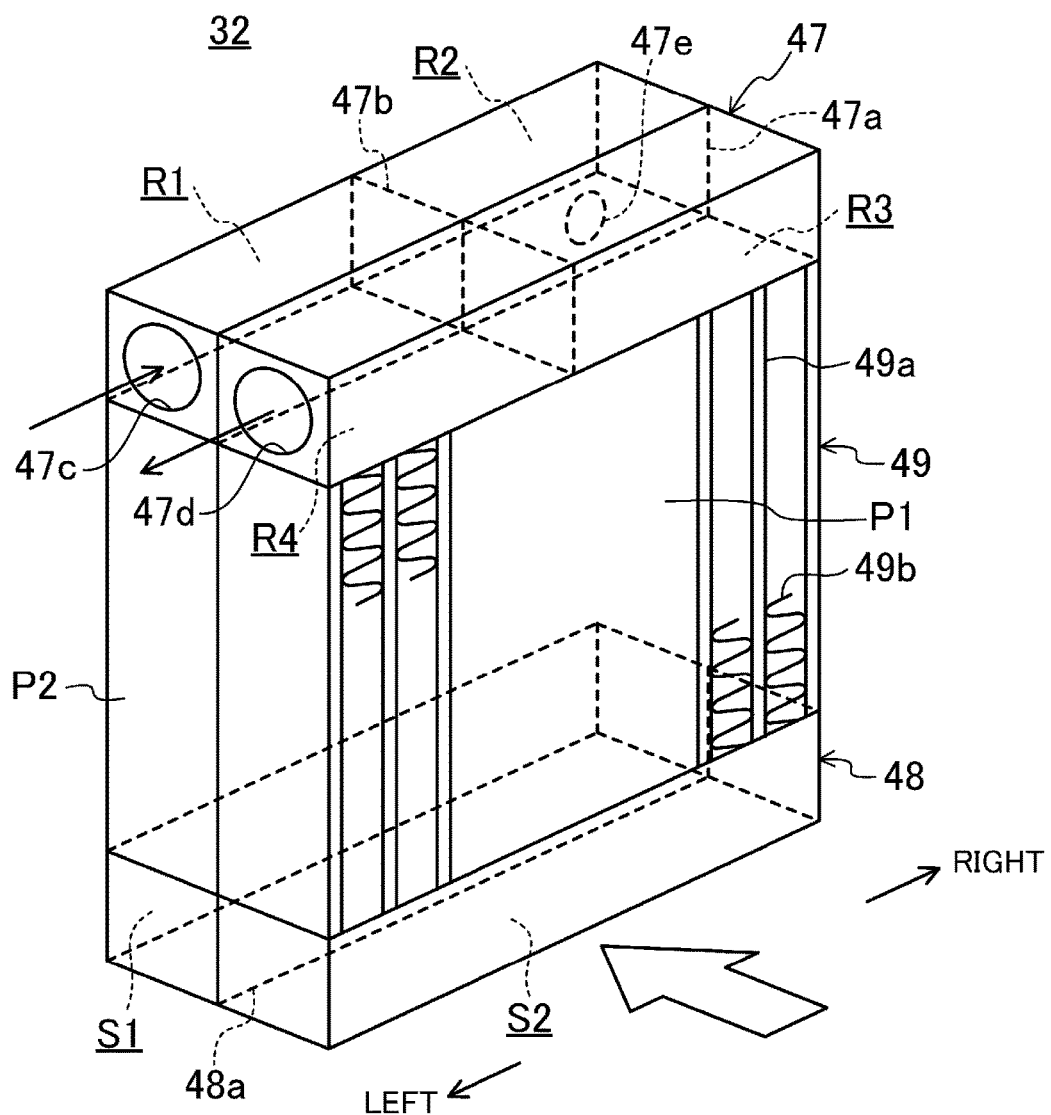
FIG. 3 is a perspective view illustrating an upstream interior heat exchanger as viewed from an upstream side in an airflow direction.

As shown in FIG. 3, the upstream interior heat exchanger 32 includes an upper header tank 47, a lower header tank 48, and a core 49. The core 49 is obtained by alternately arranging horizontally (i.e., laterally in FIG. 3), and assembling together, vertically extending tubes 49a and fins 49b and is configured so that air-conditioning air passes between those tubes 49a. The flow direction of the air-conditioning air is indicated by the open arrow. The tubes 49a are arranged in two lines in the flow direction of the outside air.

The respective upper ends of the tubes 49a located upstream and downstream in the airflow direction are all connected to the upper header tank 47 so as to communicate with each other. Inside the upper header tank 47, provided is a first partition 47a which partitions the inner space of the upper header tank 47 into an airflow upstream space and an airflow downstream space. The space located upstream of the first partition 47a in the airflow direction communicates with the respective upper ends of the upstream tubes 49a. On the other hand, the space located downstream of the first partition 47a in the airflow direction communicates with the respective upper ends of the downstream tubes 49a.

Inside the upper header tank 47, also provided is a second partition 47b which partitions the inner space of the upper header tank 47 laterally. A communication hole 47e has been cut through a portion of the first partition 47a which is located on the right-hand side of the second partition 47b.

A refrigerant inlet 47c has been cut through a portion of the left side surface of the upper header tank 47 downstream in the airflow direction, and a refrigerant outlet 47d has been cut upstream in that direction.

Inside the lower header tank 48, also provided is a partition 48a which partitions the inner space of the lower header tank 48 into airflow upstream and downstream spaces, just like the first partition 47a of the upper header tank 47. The space located upstream of the partition 48a in the airflow direction communicates with the respective lower ends of the upstream tubes 49a, while the space located downstream of the partition 48a in the airflow direction communicates with the respective lower ends of the downstream tubes 49a.

Having such a configuration, this upstream interior heat exchanger 32 has four paths in total. Specifically, first of all, a refrigerant flowing in through the inlet 47c enters a room R1 which is located downstream of the first partition 47a of the upper header tank 47 in the airflow direction and on the left hand side of the second partition 47b. Then, the refrigerant flows downward through the tubes 49a communicating with this room R1.

Thereafter, the refrigerant enters the space S1 of the lower header tank 48 which is located downstream of the partition 48a in the airflow direction, flows to the right, and then flows upward through the tubes 49a. Then, the refrigerant enters the room R2 of the upper header tank 47 located downstream of the first partition 47a in the airflow direction and on the right hand side of the second partition 47b.

Subsequently, the refrigerant in the room R2 passes through the communication hole 47e of the first partition 47a, enters the room R3 of the upper header tank 47 located upstream of the first partition 47a in the airflow direction and on the right hand side of the second partition 47b, and then flows downward through the tubes 49a communicating with the room R3.

After that, the refrigerant enters the space S2 of the lower header tank 48 located upstream of the partition 48a in the airflow direction, flows to the left, and then flows upward through the tubes 49a. Thereafter, the refrigerant enters the room R4 of the upper header tank 47 located upstream of the first partition 47a in the airflow direction and on the left hand side of the second partition 47b, and then flows out through the outlet 47d.

In the upstream interior heat exchanger 32, a windward path P1 is constituted by the path upstream in the airflow direction, and a leeward path P2 is constituted by the path downstream in the airflow direction.

The downstream interior heat exchanger 31 just has a smaller size than, but has the same or similar structure as/to, the upstream interior heat exchanger 32, and a detailed description thereof will be omitted herein. Optionally, the downstream and upstream interior heat exchangers 31 and 32 may have different structures.

The exterior heat exchanger 33 is provided near the front end of a motor room (corresponding to the engine room of an engine-driven vehicle) in a front portion of a vehicle, and is configured to catch the wind blowing against the vehicle traveling. Although not shown, the exterior heat exchanger 33 also includes an upper header tank, a lower header tank and a core. The core includes a tube that extends vertically.

As shown in FIG. 1, a cooling fan 37 is provided for the vehicle. This cooling fan 37 is driven by a fan motor 38, and is configured to blow air to the exterior heat exchanger 33. The fan motor 38 is connected to the air-conditioning controller 22 to have its ON/OFF states switched and its number of revolutions controlled. The fan motor 38 is also supplied with electric power from the traction storage battery. Note that the cooling fan 37 may also blow air to a radiator that cools a traction inverter, for example, and may also be activated even if air conditioning is not requested.

The accumulator 34 is provided near the suction port of the motor-driven compressor 30 and halfway along the fourth main refrigerant pipe 43.

On the other hand, the first main refrigerant pipe 40 connects together the discharge port of the motor-driven compressor 30 and the refrigerant inlet of the downstream interior heat exchanger 31. Moreover, the second main refrigerant pipe 41 connects together the refrigerant outlet of the downstream interior heat exchanger 31 and the refrigerant inlet of the exterior heat exchanger 33. The third main refrigerant pipe 42 connects together the refrigerant outlet of the exterior heat exchanger 33 and the refrigerant inlet of the upstream interior heat exchanger 32. The fourth main refrigerant pipe 43 connects together the refrigerant outlet of the upstream interior heat exchanger 32 and the suction port of the motor-driven compressor 30.

The first branch refrigerant pipe 44 branches from the second main refrigerant pipe 41, and is connected to the third main refrigerant pipe 42. The second branch refrigerant pipe 45 branches from the second main refrigerant pipe 41, and is connected to the fourth main refrigerant pipe 43. The third branch refrigerant pipe 46 branches from the third main refrigerant pipe 42, and is connected to the fourth main refrigerant pipe 43.

The heat pump device 20 further includes a high-pressure flow path switching valve 50, a low-pressure flow path switching valve 51, a first pressure reducing valve 52, a second pressure reducing valve 53, a first check valve 54, and a second check valve 55.

The high-pressure flow path switching valve 50 and the low-pressure flow path switching valve 51 are configured as electric three-way valves, and are controlled by the air-conditioning controller 22. The high-pressure flow path switching valve 50 is provided halfway along the second main refrigerant pipe 41, and the first branch refrigerant pipe 44 is connected to the valve 50. The low-pressure flow path switching valve 51 is provided halfway along the fourth main refrigerant pipe 43, and the third branch refrigerant pipe 46 is connected to the valve 51.

The first and second pressure reducing valves 52 and 53 are electric valves, and are switchable between an expansion state in which a flow path is narrowed to expand the refrigerant and a non-expansion state in which the flow path is opened to allow the refrigerant to flow without expanding the refrigerant. The first and second pressure reducing valves 52 and 53 are controlled by the air-conditioning controller 22. In the expansion state, their degree of opening is ordinarily set depending on the state of the air-conditioning load. However, the degrees of opening of the first and second pressure reducing valves 52 and 53 are determined so that during a dehumidification and heating operation (to be described later), the operating pressures of the upstream interior heat exchanger 32 and exterior heat exchanger 33 may be intermediate pressures, irrespective of the air-conditioning load.

The first pressure reducing valve 52 is provided closer to the upstream interior heat exchanger 32 than the point of connection between the third main refrigerant pipe 42 and the first branch refrigerant pipe 44 is, i.e., provided on a refrigerant pipe leading to the refrigerant inlet of the upstream interior heat exchanger 32. On the other hand, the second pressure reducing valve 53 is provided on the second main refrigerant pipe 41 to be closer to the exterior heat exchanger 33 than the high pressure flow path switching valve 50 is, i.e., provided on a refrigerant pipe leading to the refrigerant inlet of the exterior heat exchanger 33.

The first check valve 54 is provided on the third main refrigerant pipe 42, and is configured to allow the refrigerant to flow through the third main refrigerant pipe 42 from the exterior heat exchanger 33 toward the upstream interior heat exchanger 32 and to prevent the refrigerant from flowing in the reverse direction.

The second check valve 55 is provided on the second branch refrigerant pipe 45, and is configured to allow the refrigerant to flow through the second branch refrigerant pipe 45 from the fourth main refrigerant pipe 43 toward the second main refrigerant pipe 41 and to prevent the refrigerant from flowing in the reverse direction.

The interior air-conditioning unit 21 further includes a casing 60 housing the downstream and upstream interior heat exchangers 31 and 32, an air mix door (temperature controlling door) 62, an air mix door actuator 63 that drives the air mix door 62, blowout-mode switching doors 64, and a blower 65. Optionally, an air heater such as a PTC heater may also be provided for the casing 60.

The blower 65 is provided to select one of the air inside the vehicle cabin (inside air) or the air outside the vehicle cabin (outside air) and blow the selected air as air-conditioning air into the casing 60. The blower 65 includes a sirocco fan 65a and a blower motor 65b that drives the sirocco fan 65a in rotation. The blower motor 65b is connected to the air-conditioning controller 22 to have its ON/OFF states switched and its number of revolutions controlled. The blower motor 65b is also supplied with electric power from the traction storage battery.

The blower 65 is provided with an inside air inlet port 65c to introduce the inside air and an outside air inlet port 65d to introduce the outside air. Inside the blower 65, provided is an inside/outside air switching door 65e to open one of the inside and outside air inlet ports 65c and 65d and close the other. The blower 65 is further provided with an inside/outside air switching door actuator 61 that drives the inside/outside air switching door 65e. This inside/outside air switching door actuator 61 is controlled by the air-conditioning controller 22. The air introducing modes of this blower 65 are switchable between an inside air introducing mode in which the inside air inlet port 65c is fully opened and the outside air inlet port 65d is fully closed and an outside air introducing mode in which the inside air inlet port 65c is fully closed and the outside air inlet port 65d is fully opened. To select either one of the inside and outside air introducing modes, the occupant just needs to turn a switch. However, the air-conditioning controller 22 is designed to automatically switch to the outside air introducing mode under a predetermined condition (to be described later), even if the inside air introducing mode is selected.

The casing 60 is provided inside an instrument panel (not shown) in the vehicle cabin. The casing 60 has a defroster outlet port 60a, a vent outlet port 60b, and a heat outlet port 60c. The defroster outlet port 60a is provided to supply the air-conditioning air to the inner surface of the windshield in the vehicle cabin. The vent outlet port 60b is provided to supply the air-conditioning air to (mainly the upper body of) the occupant in the vehicle cabin. The heat outlet port 60c is provided to supply the air-conditioning air to the feet of the occupant in the cabin.

These outlet ports 60a-60c are each opened and closed by an associated one of the blowout-mode switching doors 64. Although not shown, the blowout-mode switching doors 64 are operated by an actuator connected to the air-conditioning controller 22.

Examples of the blowout modes include a defroster blowout mode in which the air-conditioning air is supplied to the defroster outlet port 60a, a vent blowout mode in which the air-conditioning air is supplied to the vent outlet port 60b, a heat blowout mode in which the air-conditioning air is supplied to the heat outlet port 60c, a defroster/heat mode in which the air-conditioning air is supplied to the defroster outlet port 60a and the heat outlet port 60c, and a bi-level mode in which the air-conditioning air is supplied to the vent outlet port 60b and the heat outlet port 60c.

All of the air-conditioning air introduced into the casing 60 passes through the upstream interior heat exchanger 32.

In the casing 60, the air mix door 62 is provided between the upstream and downstream interior heat exchangers 32 and 31. The air mix door 62 is provided to control the temperature of the air-conditioning air such that the air that has passed through the upstream interior heat exchanger 32 which is going to pass through the downstream interior heat exchanger 31 is changed to determine a mixing ratio between the air that has passed through the upstream interior heat exchanger 32 and the air that has passed through the downstream interior heat exchanger 31.

The vehicle air conditioner 1 further includes an outside air temperature sensor 70, an exterior heat exchanger temperature sensor 71, an interior heat exchanger temperature sensor (temperature detecting means) 73, an inside air temperature sensor 75 and a humidity sensor 76. These sensors are connected to the air-conditioning controller 22.

The outside air temperature sensor 70 is provided upstream of the exterior heat exchanger 33 in the airflow direction in order to detect the temperature of the outside air (outside air temperature TG) that has not entered the exterior heat exchanger 33 yet. On the other hand, the exterior heat exchanger temperature sensor 71 is arranged on a surface of the exterior heat exchanger 33 which is located downstream in the airflow direction in order to detect the surface temperature of the exterior heat exchanger 33.

The interior heat exchanger temperature sensor 73 is provided downstream of the upstream interior heat exchanger 32 in the airflow direction in order to detect the surface temperature of the upstream interior heat exchanger 32. Based on the temperature of the upstream interior heat exchanger 32 detected downstream in the airflow direction by the interior heat exchanger temperature sensor 73, a determination may be made whether or not frost has been deposited in the upstream interior heat exchanger 32.

The inside air temperature sensor 75 is provided to detect the temperature inside the vehicle cabin (the inside air temperature TR) and is arranged at a predetermined position inside the vehicle cabin. The humidity sensor 76 is provided to detect the humidity inside the vehicle cabin (interior humidity RH) and is arranged at a predetermined position inside the vehicle cabin. The inside air temperature sensor 75 and humidity sensor 76 are ones that have been known in the art, and a detailed description thereof will be omitted herein.

The vehicle air conditioner 1 further has operating buttons 80 (see FIG. 2) provided inside the vehicle cabin. These operating buttons 80 are connected to the air-conditioning controller 22. Examples of those operating buttons 80 include a button to change the blowout modes, a button to change the temperature setting, and a button to change the volume of the air to blow. In the case of this vehicle, those buttons further include a DEF button to change the blowout modes into the defroster blowout mode. Although not shown, the vehicle air conditioner 1 further includes a sensor to detect the intensity of solar radiation.

The air-conditioning controller 22 controls the heat pump device 20 and other components by reference to multiple pieces of information including the temperature set by the occupant, the outside air temperature, the temperature inside the vehicle cabin, the humidity inside the vehicle cabin and the intensity of solar radiation. The air-conditioning controller 22 may be implemented as a well-known central processing unit, ROM, or RAM, for example. In addition, the air-conditioning controller 22 further controls the motor-driven compressor 30 and the fan motor 38 depending on the air-conditioning load.

As in an ordinary automatic air conditioning control, the air-conditioning controller 22 controls, through a main routine to be described later, a switch of the operation modes of the heat pump device 20, the volume of the air to be blown by the blower 65, the degree of opening of the air mix door 62, a switch of the blowout modes, a switch of the air introducing modes, the motor-driven compressor 30, and the blower motor 65b. For example, although the fan motor 38 basically is activated while the motor-driven compressor 30 is activated, the fan motor 38 also is activated even if the motor-driven compressor 30 is at a stop, e.g., when the traction inverter needs to be cooled.

The operation modes of the heat pump device 20 include: a cooling operation mode; a defrosting and dehumidification operation mode; a gentle dehumidification and heating operation mode (first dehumidification and heating operation mode); a first frost reducing operation mode; a powerful dehumidification and heating operation mode (second dehumidification and heating operation mode); a second frost reducing operation mode; a gentle frost reducing operation mode (third frost reducing mode); and a heating operation mode.

Figure 4:
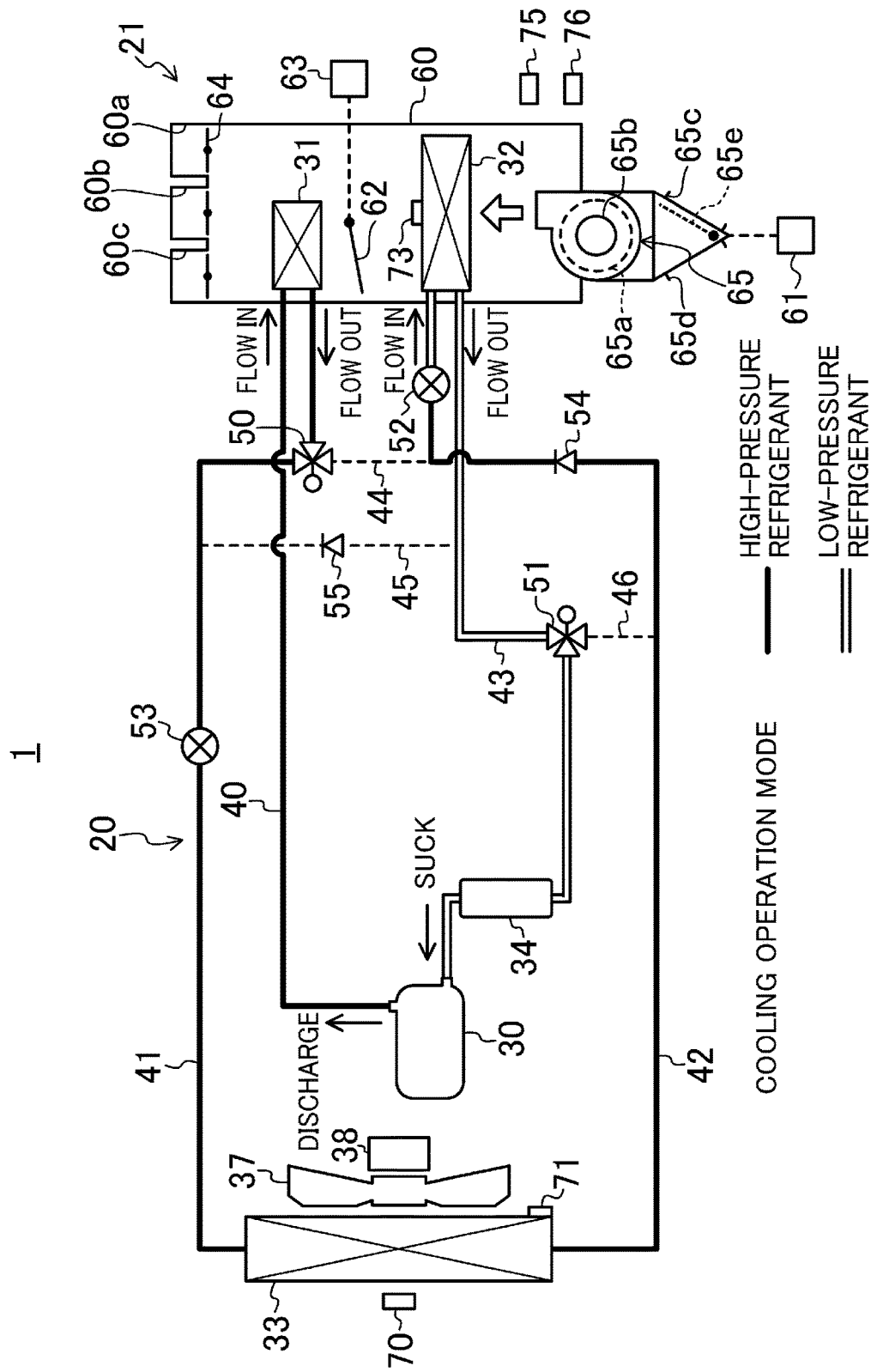
FIG. 4 is a diagram corresponding to FIG. 1 and illustrating how the air conditioner operates in a cooling operation mode.

The cooling operation mode shown in FIG. 4 is selected when the outside air temperature is higher than 25° C., for example. In the cooling operation mode, the downstream interior heat exchanger 31 is made to function as a radiator, the upstream interior heat exchanger 32 is made to function as a heat absorber, and the exterior heat exchanger 33 is made to function as a radiator.

Specifically, the high-pressure flow path switching valve 50 switches the flow paths such that a refrigerant that has flowed out of the downstream interior heat exchanger 31 does not flow into the upstream interior heat exchanger 32 through the inlet thereof but flows toward the second pressure reducing valve 53. On the other hand, the low-pressure flow path switching valve 51 switches the flow paths such that the refrigerant that has flowed out of the upstream interior heat exchanger 32 flows into the accumulator 34. The first pressure reducing valve 52 is turned into the expansion state, and the second pressure reducing valve 53 is turned into the non-expansion state.

If the motor-driven compressor 30 is activated in this state, the high-pressure refrigerant discharged from the motor-driven compressor 30 flows into the downstream interior heat exchanger 31 through the first main refrigerant pipe 40, and circulates through the downstream interior heat exchanger 31. The refrigerant that has circulated through the downstream interior heat exchanger 31 flows, without expanding, into the exterior heat exchanger 33 through the second main refrigerant pipe 41. The refrigerant that has flowed into the exterior heat exchanger 33 dissipates heat, and expands by passing through the first pressure reducing valve 52 via the third main refrigerant pipe 42. Then, the refrigerant flows into the upstream interior heat exchanger 32. The refrigerant that has flowed into the upstream interior heat exchanger 32 circulates through the upstream interior heat exchanger 32 to absorb heat from the air-conditioning air. The refrigerant that has circulated through the upstream interior heat exchanger 32 passes through the fourth main refrigerant pipe 43 and is sucked into the motor-driven compressor 30 via the accumulator 34.

In the cooling operation mode, the degree of opening of the air mix door 62 is determined so that the air-conditioning air that has passed through the upstream interior heat exchanger 32 hardly flows into the downstream interior heat exchanger 31.

Figure 13:
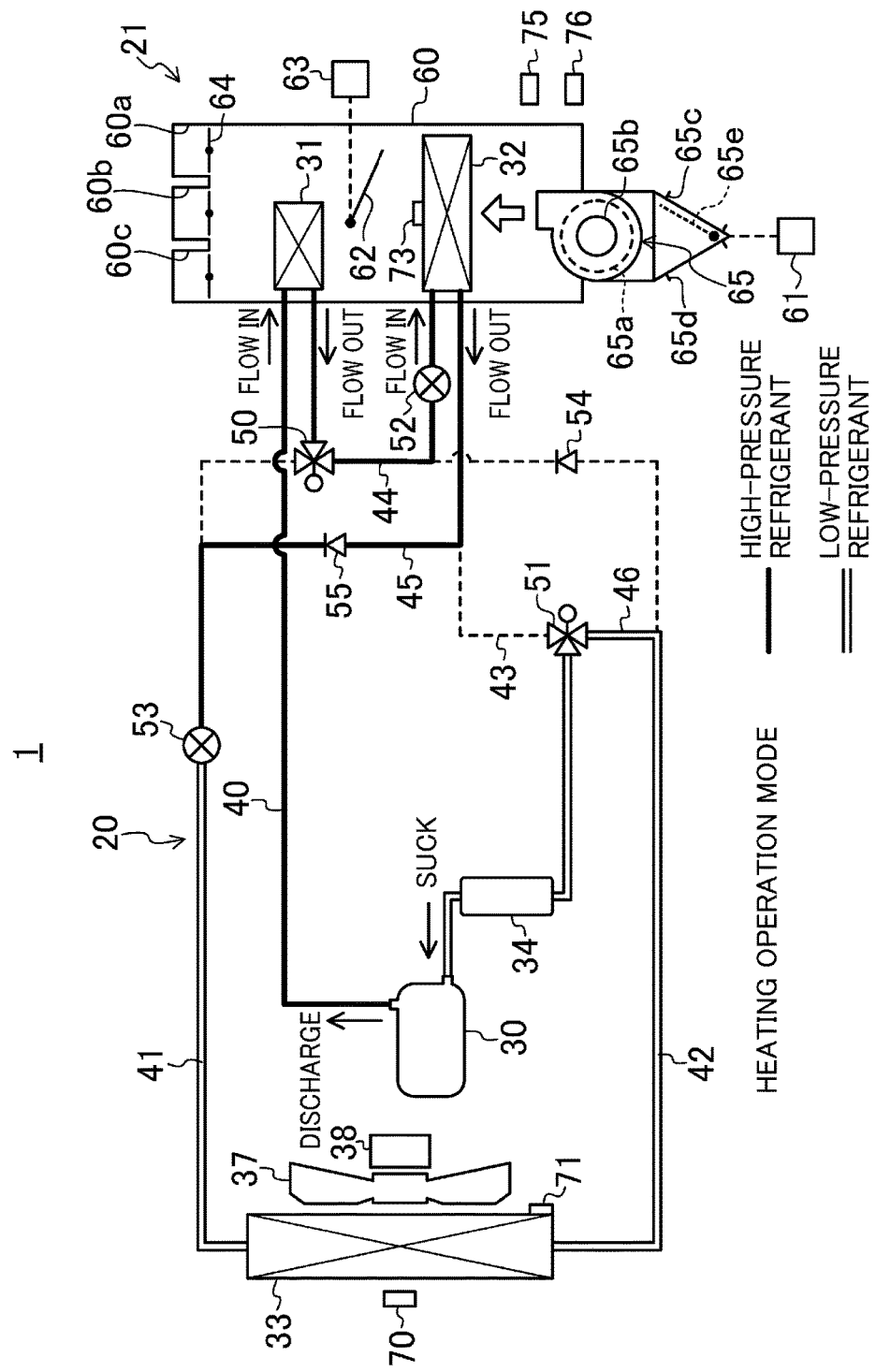
FIG. 13 is a diagram corresponding to FIG. 1 and illustrating how the air conditioner operates in a heating operation mode.

Meanwhile, the heating operation mode shown in FIG. 13 is selected when the outside air temperature is lower than 0° C. (at an extremely low outside air temperature), for example. In the heating operation mode, the downstream and upstream interior heat exchangers 31 and 32 are made to function as radiators, and the exterior heat exchanger 33 is made to function as a heat absorber.

Specifically, the high-pressure flow path switching valve 50 switches the flow paths such that the refrigerant that has flowed out of the downstream interior heat exchanger 31 flows into the upstream interior heat exchanger 32 through the inlet thereof. Meanwhile, the low-pressure flow path switching valve 51 switches the flow paths such that the refrigerant that has flowed out of the exterior heat exchanger 33 flows into the accumulator 34. The first pressure reducing valve 52 is turned into the non-expansion state, and the second pressure reducing valve 53 is turned into the expansion state.

If the motor-driven compressor 30 is activated in this state, the high-pressure refrigerant discharged from the motor-driven compressor 30 flows into the downstream interior heat exchanger 31 through the first main refrigerant pipe 40, and circulates through the downstream interior heat exchanger 31. The refrigerant that has circulated through the downstream interior heat exchanger 31 flows through the second main refrigerant pipe 41 into the upstream interior heat exchanger 32 via the first branch refrigerant pipe 44. Then, the refrigerant circulates through the upstream interior heat exchanger 32. That is, since the high-temperature refrigerant flows into the downstream and upstream interior heat exchangers 31 and 32, the air-conditioning air is heated by both of the downstream and upstream interior heat exchangers 31 and 32. As a result, a high heating capacity is achieved.

The refrigerant that has circulated through the upstream interior heat exchanger 32 flows through the fourth main refrigerant pipe 43 into the second main refrigerant pipe 41 via the second branch refrigerant pipe 45. The refrigerant that has flowed into the second main refrigerant pipe 41 expands by passing through the second pressure reducing valve 53, and then flows into the exterior heat exchanger 33. The refrigerant that has flowed into the exterior heat exchanger 33 absorbs heat from the outside air. Then, the refrigerant passes through the third main refrigerant pipe 42 and the third branch refrigerant pipe 46 in this order, and is sucked into the motor-driven compressor 30 by way of the accumulator 34.

In the heating operation mode, the degree of opening of the air mix door 62 is determined so that most of the air-conditioning air that has passed through the upstream interior heat exchanger 32 passes through the downstream interior heat exchanger 31.

Figure 5:
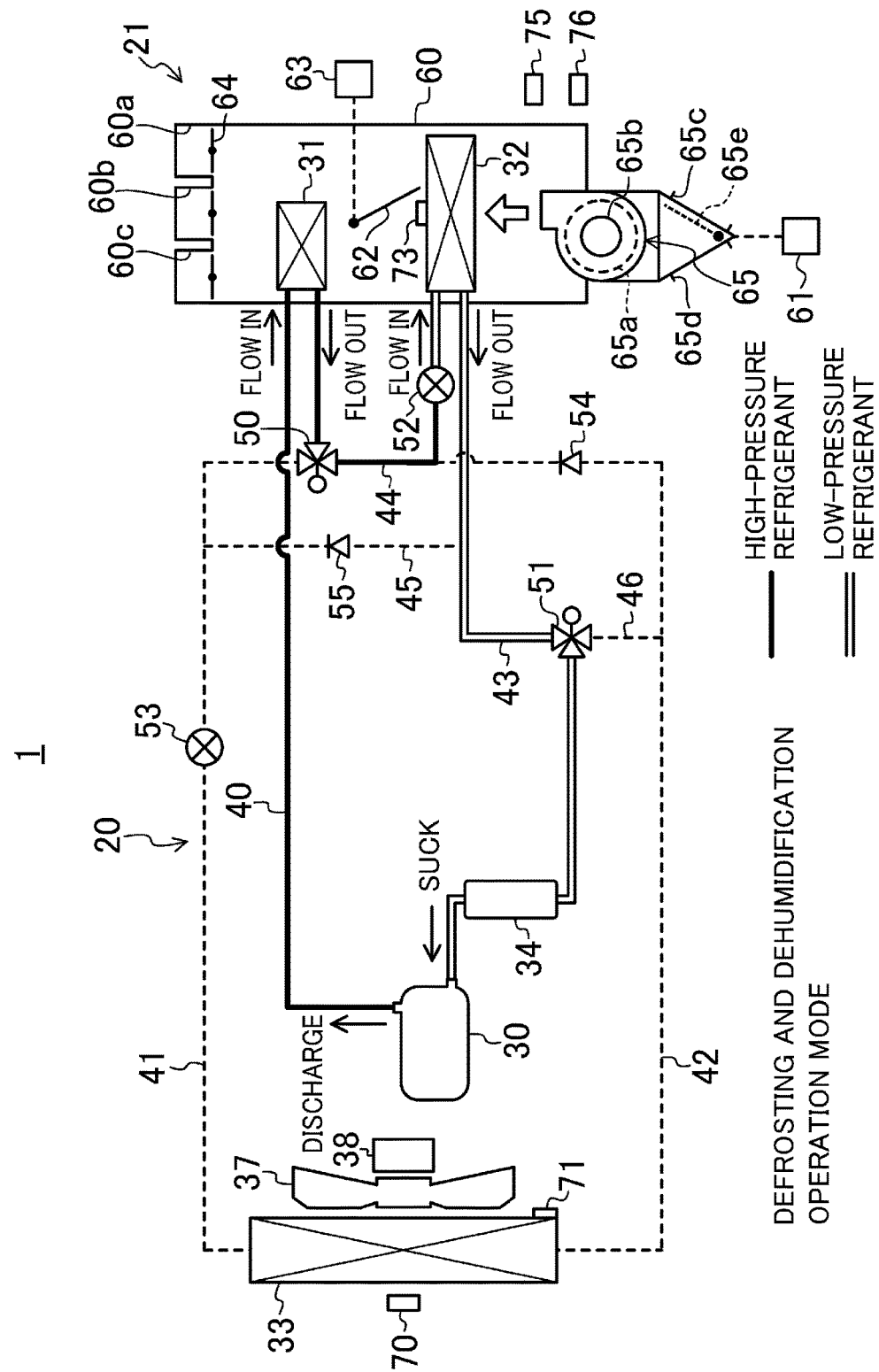
FIG. 5 is a diagram corresponding to FIG. 1 and illustrating how the air conditioner operates in a defrosting and dehumidification operation mode.

The defrosting and dehumidification operation mode shown in FIG. 5 is selected if the exterior heat exchanger 33 gets frosted during the dehumidification and heating operation. In the defrosting and dehumidification operation mode, the upstream interior heat exchanger 32 is made to function as a heat absorber while the downstream interior heat exchanger 31 is still allowed to function as a radiator. Also, the refrigerant is allowed to flow while bypassing the exterior heat exchanger 33.

That is to say, the high-pressure flow path switching valve 50 is maintained in the same state as in the heating operation mode. The low-pressure flow path switching valve 51 switches the flow paths so that the refrigerant that has flowed out of the upstream interior heat exchanger 32 flows into the accumulator 34. The first pressure reducing valve 52 is turned into the expansion state. Note that no refrigerant flows through the second pressure reducing valve 53.

If the motor-driven compressor 30 is activated in this state, the high-pressure refrigerant discharged from the motor-driven compressor 30 flows into the downstream interior heat exchanger 31 through the first main refrigerant pipe 40, and circulates through the downstream interior heat exchanger 31. The refrigerant that has circulated through the downstream interior heat exchanger 31 flows through the second main refrigerant pipe 41 and the first branch refrigerant pipe 44 and reaches the first pressure reducing valve 52. The refrigerant that has expanded by passing through the first pressure reducing valve 52 flows into the upstream interior heat exchanger 32, where the refrigerant absorbs heat. The refrigerant that has circulated through the upstream interior heat exchanger 32 flows through the fourth main refrigerant pipe 43 and then is sucked into the motor-driven compressor 30 via the accumulator 34. In this operation mode, since no low-temperature refrigerant flows through the exterior heat exchanger 33, the surface temperature of the exterior heat exchanger 33 will rise under the influence of the air surrounding the exterior heat exchanger 33 and the air blown against the exterior heat exchanger 33 while the vehicle is traveling. As a result, the frost in the exterior heat exchanger 33 soon melts to defrost the exterior heat exchanger 33. In addition, since the refrigerant absorbs heat in the upstream interior heat exchanger 32, dehumidification is also done.

Figure 6:
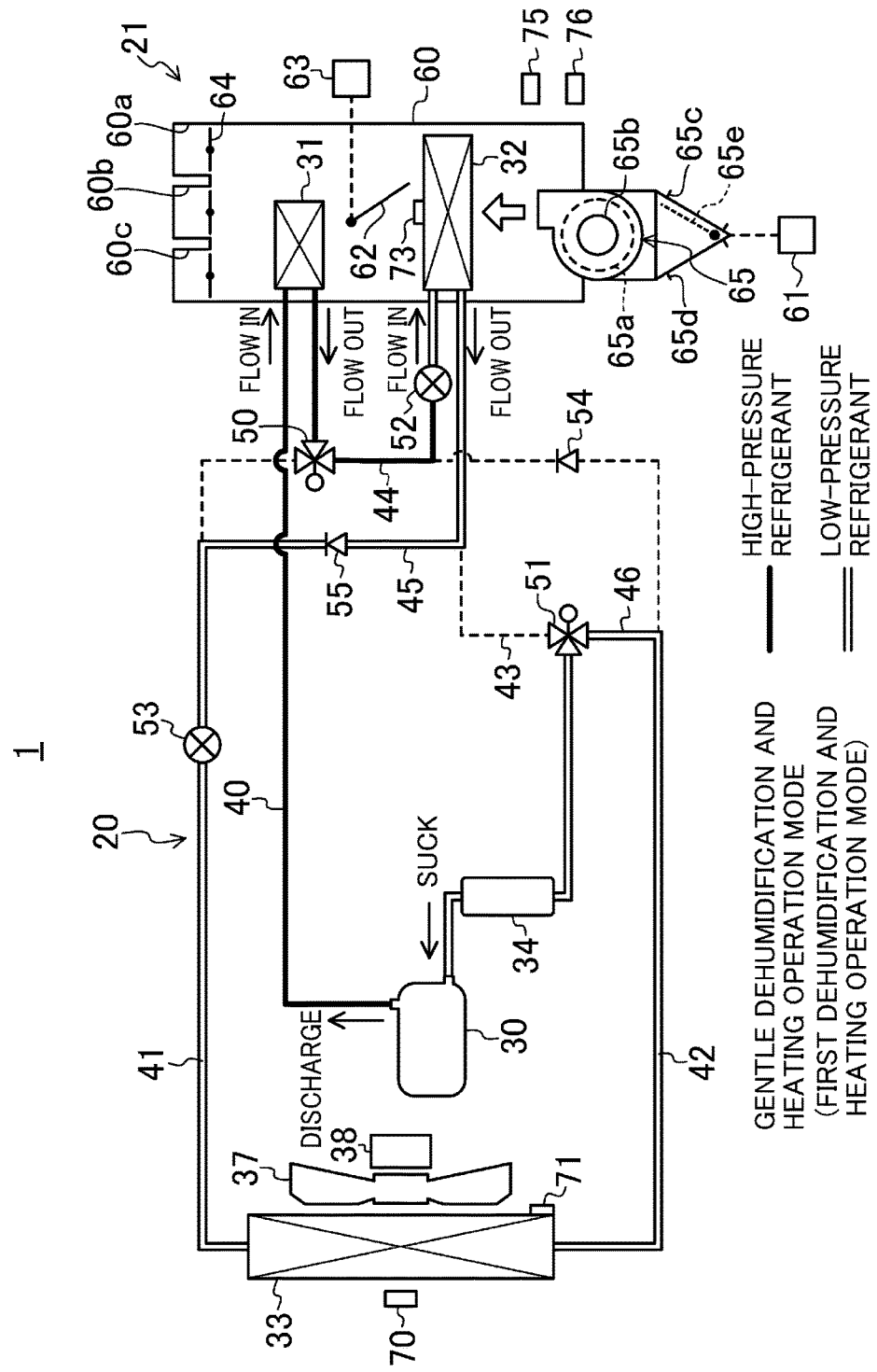
FIG. 6 is a diagram corresponding to FIG. 1 and illustrating how the air conditioner operates in a gentle dehumidification and heating operation mode.

The gentle dehumidification and heating operation mode shown in FIG. 6 is selected when the outside air temperature is equal to or higher than 0° C. and lower than 10° C., for example. In the gentle dehumidification and heating operation mode, the downstream interior heat exchanger 31 is made to function as a radiator, and the exterior heat exchanger 33 and the upstream interior heat exchanger 32 are made to function as heat absorbers.

Specifically, the high-pressure flow path switching valve 50 switches the flow paths such that the refrigerant that has flowed out of the downstream interior heat exchanger 31 flows into the upstream interior heat exchanger 32 through the inlet thereof. Meanwhile, the low-pressure flow path switching valve 51 switches the flow paths such that the refrigerant that has flowed out of the exterior heat exchanger 33 flows into the accumulator 34. The first pressure reducing valve 52 is turned into the expansion state, and the second pressure reducing valve 53 is turned into the non-expansion state.

If the motor-driven compressor 30 is activated in this state, the high-pressure refrigerant discharged from the motor-driven compressor 30 flows into the downstream interior heat exchanger 31 through the first main refrigerant pipe 40, and circulates through the downstream interior heat exchanger 31. The refrigerant that has circulated through the downstream interior heat exchanger 31 flows through the second main refrigerant pipe 41 and the first branch refrigerant pipe 44, expands by passing through the first pressure reducing valve 52, and then flows into, and circulates through, the upstream interior heat exchanger 32. That is to say, in the upstream interior heat exchanger 32, the refrigerant absorbs heat and cools the air-conditioning air to dehumidify the air. Meanwhile, in the downstream interior heat exchanger 31, the refrigerant dissipates heat and heats the air-conditioning air. This thus allows for carrying out a dehumidification and heating operation.

The refrigerant that has circulated through the upstream interior heat exchanger 32 flows through the fourth main refrigerant pipe 43 into the second main refrigerant pipe 41 via the second branch refrigerant pipe 45. The refrigerant flowing into the second main refrigerant pipe 41 flows into the exterior heat exchanger 33 without expanding. The refrigerant that has flowed into the exterior heat exchanger 33 absorbs heat from the outside air. Then, the refrigerant passes through the third main refrigerant pipe 42 and the third branch refrigerant pipe 46 in this order, and is sucked into the motor-driven compressor 30 by way of the accumulator 34.

In the gentle dehumidification and heating operation mode, the air-conditioning controller 22 adjusts the operating pressure of the upstream interior heat exchanger 32 by changing the degrees of pressure reduction at the first and second pressure reducing valves 52 and 53. In this case, the adjustment may be made so that the operating pressure of the upstream interior heat exchanger 32 becomes an intermediate pressure.

The air-conditioning controller 22 is configured to control the first pressure reducing valve 52 based on the temperature of the upstream interior heat exchanger 32 that has been detected downstream in the airflow direction by the interior heat exchanger temperature sensor 73. The degree of dehumidification may be estimated by the temperature of the upstream interior heat exchanger 32 that has been detected downstream in the airflow direction by the interior heat exchanger temperature sensor 73. If this degree of dehumidification needs to be changed, the temperature of the refrigerant flowing into the upstream interior heat exchanger 32 may be changed by adjusting the degree of pressure reduction at the first pressure reducing valve 52 based on the temperature detected by the interior heat exchanger temperature sensor 73. The second pressure reducing valve 53 may also be controlled based on the temperature detected by the exterior heat exchanger temperature sensor 71.

Optionally, depending on the situation, the first pressure reducing valve 52 may be turned into the non-expansion state and the second pressure reducing valve 53 may be turned into the expansion state.

Figure 7:
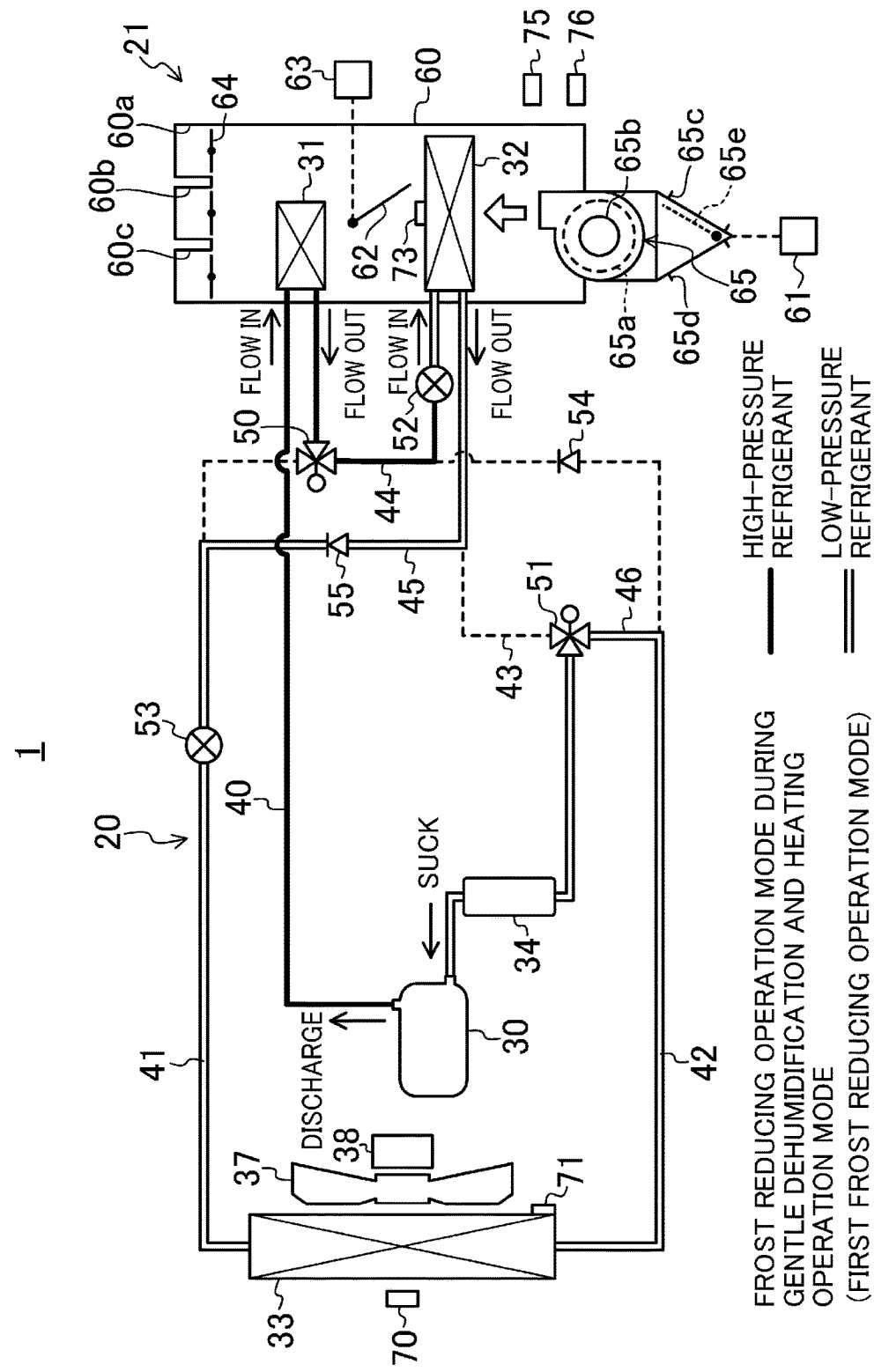
FIG. 7 is a diagram corresponding to FIG. 1 and illustrating how the air conditioner operates in a first frost reducing operation mode.

As in the situation where the upstream interior heat exchanger 32 gets frosted during the gentle dehumidification and heating mode of operation, the first frost reducing operation mode shown in FIG. 7 is selected when a frost reducing operation is needed. Note that "frost" refers to a phenomenon that the water that has been condensed on the surface of the upstream interior heat exchanger 32 is cooled to a temperature below the freezing temperature to get frozen.

In the first frost reducing operation mode, the refrigerant flows as in the gentle dehumidification and heating operation mode shown in FIG. 6.

In the first frost reducing operation mode, the downstream interior heat exchanger 31 is made to function as a radiator and the upstream interior heat exchanger 32 and exterior heat exchanger 33 are made to function as heat absorbers.

Specifically, the high-pressure flow path switching valve 50 switches the flow paths so that the refrigerant that has flowed out of the downstream interior heat exchanger 31 flows into the upstream interior heat exchanger 32 through the inlet thereof without flowing toward the second pressure reducing valve 53. Meanwhile, the low-pressure flow path switching valve 51 switches the flow paths so that the refrigerant that has flowed out of the upstream interior heat exchanger 32 flows into the accumulator 34. The first pressure reducing valve 52 is turned into the non-expansion state and the second pressure reducing valve 53 is turned into the expansion state.

If the motor-driven compressor 30 is activated in this state, the high-pressure refrigerant discharged from the motor-driven compressor 30 flows into the downstream interior heat exchanger 31 through the first main refrigerant pipe 40, and circulates through the downstream interior heat exchanger 31. Thus, the air-conditioning air may be heated by the downstream interior heat exchanger 31.

The refrigerant that has circulated through the downstream interior heat exchanger 31 flows through the second main refrigerant pipe 41, expands by passing through the second pressure reducing valve 53, and then flows into the exterior heat exchanger 33. The refrigerant that has flowed into the exterior heat exchanger 33 absorbs heat, and then flows, without expanding, into the upstream interior heat exchanger 32 through the third main refrigerant pipe 42. The temperature of the refrigerant that has flowed into the upstream interior heat exchanger 32 has risen due to the absorption of heat by the exterior heat exchanger 33. Thus, the refrigerant dissipates heat while circulating through the upstream interior heat exchanger 32. As a result, the frost is reducible. After having circulated through the upstream interior heat exchanger 32, the refrigerant flows through the fourth main refrigerant pipe 43 and then is sucked into the motor-driven compressor 30 via the accumulator 34.

In the first frost reducing operation mode, the air-conditioning controller 22 controls the first pressure reducing valve 52 so that the degree of pressure reduction decreases so much as to make the temperature of the refrigerant flowing into the upstream interior heat exchanger 32 higher than in the gentle dehumidification and heating operation mode. As a result, the ability to reduce frost improves. Then, the air-conditioning controller 22 further controls the second pressure reducing valve 53 so that the degree of pressure reduction increases so much as to make the temperature of the refrigerant flowing into the exterior heat exchanger 33 fall. This ensures that the quantity of heat absorbed by the overall system is kept high enough to enable a stabilized operation.

Figure 8:
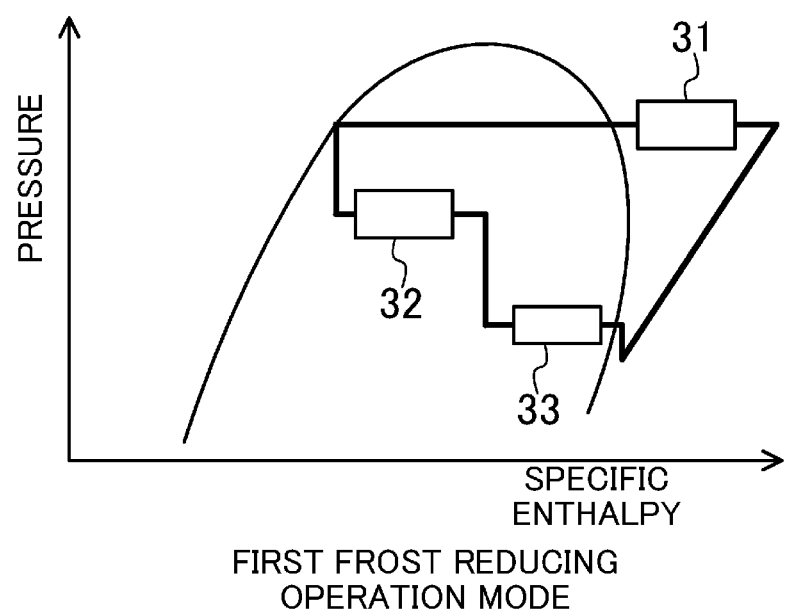
FIG. 8 is a Mollier chart illustrating how the air conditioner operates in the first frost reducing operation mode.

As can be seen from the Mollier chart shown in FIG. 8, in the first frost reducing mode, the refrigerant discharged from the compressor 30 flows into the downstream interior heat exchanger 31 and dissipates heat, and then flows into the upstream interior heat exchanger 32 via the first expansion valve 52 and absorbs heat. Thereafter, the refrigerant flows into the exterior heat exchanger 33 and then is sucked into the compressor 30.

Figure 9:
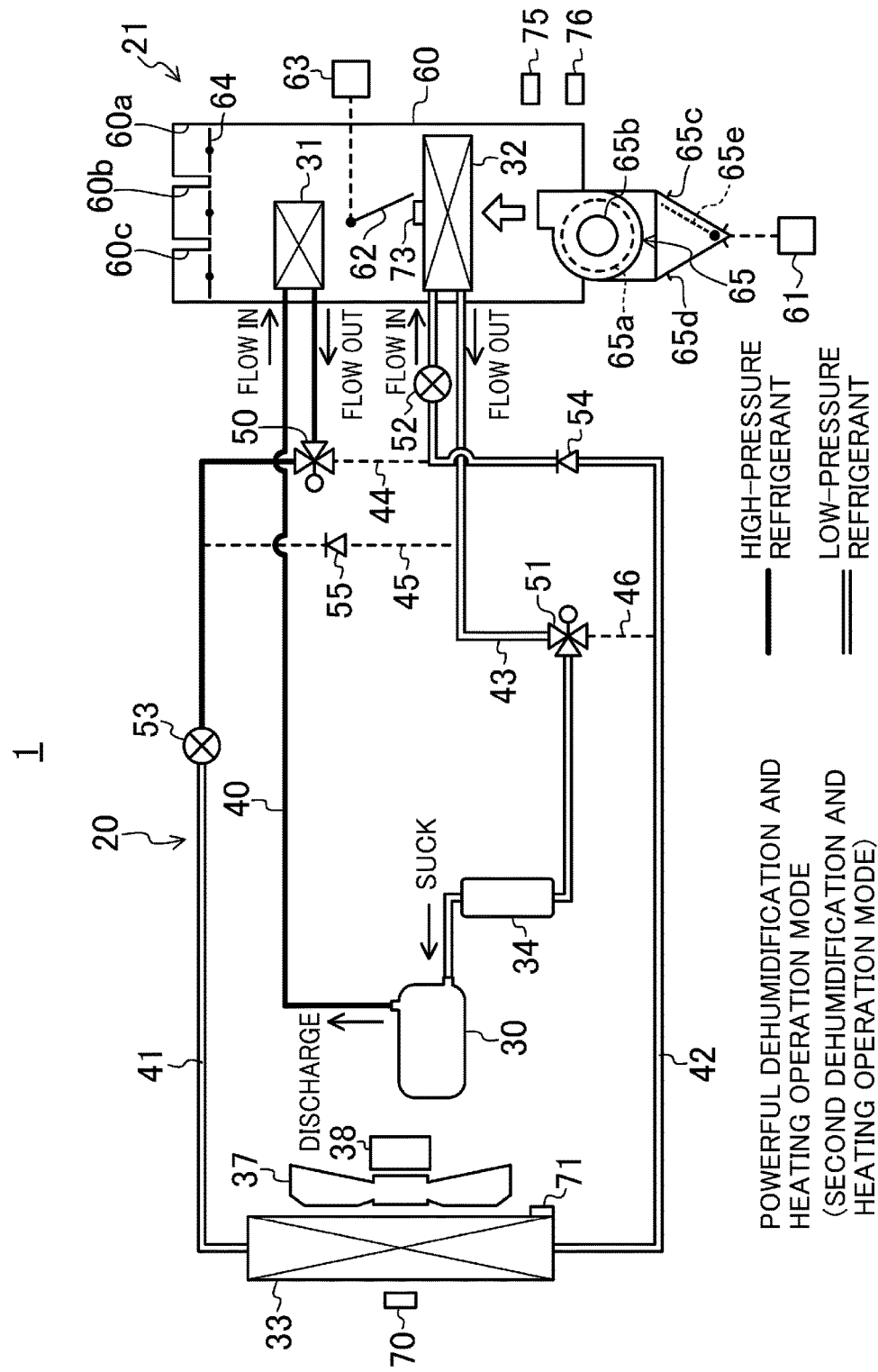
FIG. 9 is a diagram corresponding to FIG. 1 and illustrating how the air conditioner operates in a powerful dehumidification and heating operation mode.

The powerful dehumidification and heating operation mode shown in FIG. 9 is selected when the outside air temperature is in the range of 10° C. to 25° C., for example. In the powerful dehumidification and heating operation mode, the downstream interior heat exchanger 31 is made to function as a radiator, and the exterior heat exchanger 33 and the upstream interior heat exchanger 32 are made to function as heat absorbers.

Specifically, the high-pressure flow path switching valve 50 switches the flow paths to prevent the refrigerant that has flowed out of the downstream interior heat exchanger 31 from flowing into the upstream interior heat exchanger 32 through the inlet thereof but to allow the refrigerant flow toward the second pressure reducing valve 53. Meanwhile, the low-pressure flow path switching valve 51 switches the flow paths such that the refrigerant that has flowed out of the upstream interior heat exchanger 32 flows into the accumulator 34. Both of the first and second pressure reducing valves 52 and 53 are turned into the expansion state.

If the motor-driven compressor 30 is activated in this state, the high-pressure refrigerant discharged from the motor-driven compressor 30 flows into the downstream interior heat exchanger 31 through the first main refrigerant pipe 40, and circulates through the downstream interior heat exchanger 31. The refrigerant that has circulated through the downstream interior heat exchanger 31 flows through the second main refrigerant pipe 41, expands by passing through the second pressure reducing valve 53, and then flows into the exterior heat exchanger 33. Then, the refrigerant that has flowed into the exterior heat exchanger 33 passes through the third main refrigerant pipe 42 without expanding and then flows into the upstream interior heat exchanger 32. The refrigerant that has flowed into the upstream interior heat exchanger 32 circulates through the upstream interior heat exchanger 32 and absorbs heat from the air-conditioning air. The refrigerant that has circulated through the upstream interior heat exchanger 32 passes through the fourth main refrigerant pipe 43 and then is sucked into the motor-driven compressor 30 via the accumulator 34.

That is to say, in the upstream interior heat exchanger 32, the refrigerant absorbs heat and cools the air-conditioning air, thus dehumidifying the air. In the downstream interior heat exchanger 31, on the other hand, the refrigerant dissipates heat and heats the air-conditioning air, thus allowing for performing a dehumidification and heating operation.

Since the evaporating pressure of the upstream interior heat exchanger 32 becomes lower than that of the exterior heat exchanger 33, a larger quantity of heat is absorbed by the upstream interior heat exchanger 32 in the powerful dehumidification and heating operation mode than in the gentle dehumidification and heating operation mode. Thus, in the powerful dehumidification and heating operation mode, the degree of dehumidification per unit time increases compared to the gentle dehumidification and heating operation mode. For that reason, the powerful dehumidification and heating operation mode is adopted.

Alternatively, the first pressure reducing valve 52 may be turned into the non-expansion state and the second pressure reducing valve 53 may be turned into the expansion state.

In the powerful dehumidification and heating operation mode, the air-conditioning controller 22 changes the degree of pressure reduction at the second pressure reducing valve 53 to adjust the operating pressure of the exterior heat exchanger 33. In this case, the operating pressure of the exterior heat exchanger 33 may be adjusted to an intermediate pressure.

Also, as in the gentle dehumidification and heating operation mode, the air-conditioning controller 22 adjusts the degree of pressure reduction at the first and second pressure reducing valves 52 and 53 based on the temperature detected by the interior heat exchanger temperature sensor 73, thereby changing the temperature of the refrigerant flowing into the upstream interior heat exchanger 32.

Figure 10:
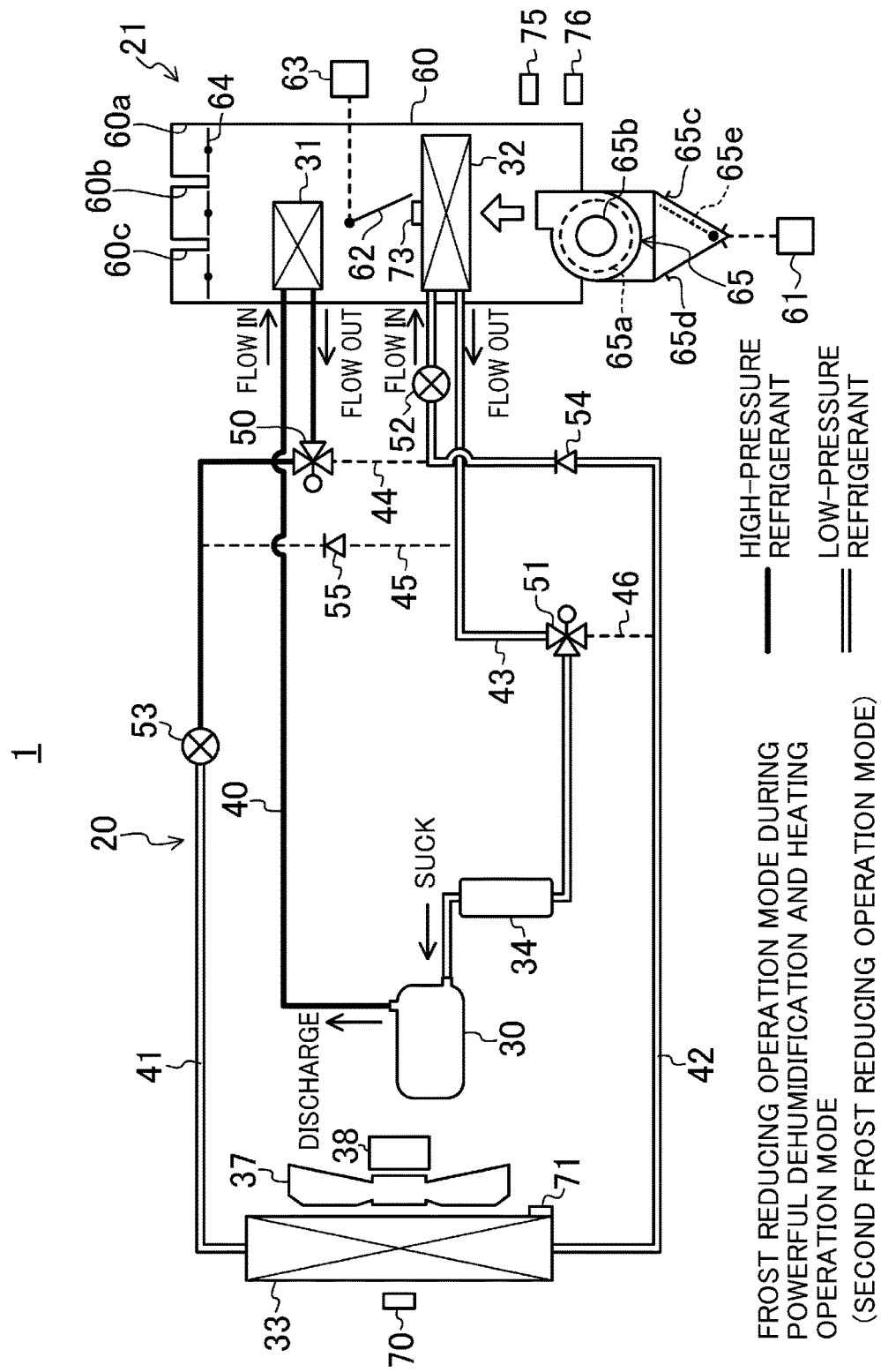
FIG. 10 is a diagram corresponding to FIG. 1 and illustrating how the air conditioner operates in a second frost reducing operation mode.

The second frost reducing operation mode shown in FIG. 10 is selected when the frost reducing operation is required as in a situation where the upstream interior heat exchanger 32 gets frosted during the powerful dehumidification and heating mode of operation.

In the second frost reducing operation mode, the downstream interior heat exchanger 31 is made to function as a radiator, and the upstream interior heat exchanger 32 and exterior heat exchanger 33 are made to function as heat absorbers.

Figure 11:
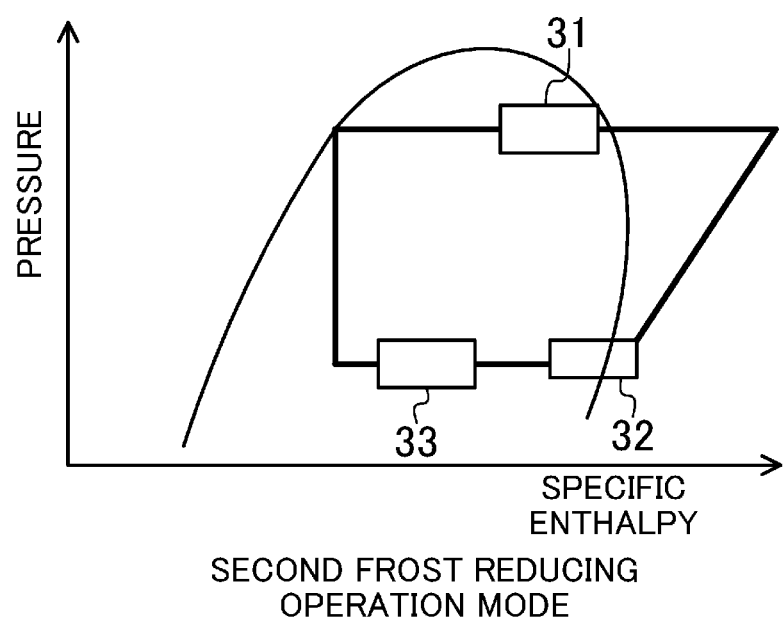
FIG. 11 is a Mollier chart illustrating how the air conditioner operates in the second frost reducing operation mode.

As can be seen from the Mollier chart shown in FIG. 11, in the second frost reducing mode, the refrigerant discharged from the compressor 30 flows into the downstream interior heat exchanger 31 and dissipates heat, and then flows into the exterior heat exchanger 33 via the second expansion valve 53 and absorbs heat. Thereafter, the refrigerant flows into the upstream interior heat exchanger 32 and absorbs heat.

The temperature of the refrigerant that has flowed into the upstream interior heat exchanger 32 has risen due to the absorption of heat by the exterior heat exchanger 33. If the temperature has exceeded 0° C., for example, then the refrigerant circulates through the upstream interior heat exchanger 32 to the point that the frost is reducible. Comparing the first and second frost reducing operation modes to each other, the first frost reducing operation mode has the higher frost reducing ability than the other mode. The refrigerant that has circulated through the upstream interior heat exchanger 32 flows through the fourth main refrigerant pipe 43 and then is sucked into the motor-driven compressor 30 via the accumulator 34.

In the second frost reducing operation mode, the second pressure reducing valve 53 is controlled to make the refrigerant absorb heat at the exterior heat exchanger 33 by decreasing the temperature of the refrigerant flowing into the exterior heat exchanger 33 compared to during the second dehumidification and heating operation mode. Then, the first pressure reducing valve 52 is controlled so as to increase the degree of pressure reduction such that the refrigerant flowing into the upstream interior heat exchanger 32 gets superheated. As a result, the frost reducing ability further improves.

Figure 12:
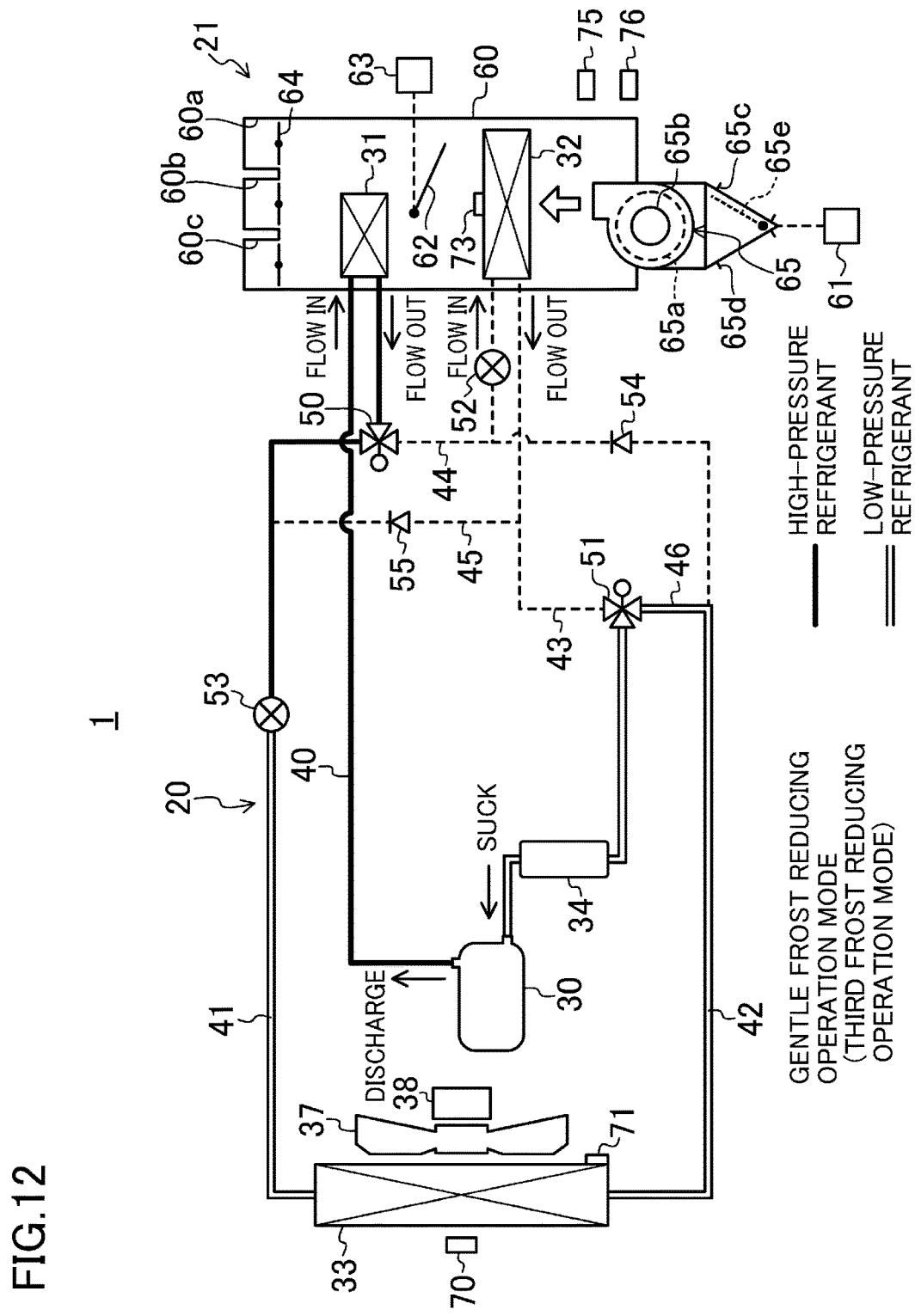
FIG. 12 is a diagram corresponding to FIG. 1 and illustrating how the air conditioner operates in a gentle frost reducing operation mode.

The gentle frost reducing operation mode shown in FIG. 12 is selected when the frost reducing operation is required as in a situation where the upstream interior heat exchanger 32 gets frosted during the gentle or powerful dehumidification and heating mode of operation, for example. Specifically, as will be described later, the gentle frost reducing operation mode is selected when the frost reducing ability may be lower than in the first or second frost reducing operation mode.

In the gentle frost reducing operation mode, the downstream interior heat exchanger 31 is made to function as a radiator, the exterior heat exchanger 33 is made to function as a heat absorber, and the refrigerant is allowed to flow while bypassing the upstream interior heat exchanger 32.

Specifically, the high-pressure flow path switching valve 50 switches the flow paths to prevent the refrigerant that has flowed out of the downstream interior heat exchanger 31 from flowing into the upstream interior heat exchanger 32 through the inlet thereof but to allow the refrigerant flow toward the second pressure reducing valve 53. Meanwhile, the low-pressure flow path switching valve 51 switches the flow paths such that the refrigerant that has flowed out of the exterior heat exchanger 33 flows into the accumulator 34. The second pressure reducing valve 53 is turned into the expansion state.

If the motor-driven compressor 30 is activated in this state, the high-pressure refrigerant discharged from the motor-driven compressor 30 flows into the downstream interior heat exchanger 31 through the first main refrigerant pipe 40, and circulates through the downstream interior heat exchanger 31. Thus, the downstream interior heat exchanger 31 is allowed to heat the air-conditioning air.

The refrigerant that has circulated through the downstream interior heat exchanger 31 flows through the second main refrigerant pipe 41, expands by passing through the second pressure reducing valve 53, and then flows into the exterior heat exchanger 33. Then, the refrigerant that has flowed into the exterior heat exchanger 33 absorbs heat, passes through the third main refrigerant pipe 42, the third branch refrigerant pipe 46 and the fourth main refrigerant pipe 43 in this order, and then is sucked into the motor-driven compressor 30 via the accumulator 34.

In this gentle frost reducing operation mode, no low temperature refrigerant flows through the upstream interior heat exchanger 32 but the air-conditioning air is blown by the blower 65 against the upstream interior heat exchanger 32. Since the temperature of this air-conditioning air is substantially equal to the outside air temperature, the frost in the upstream interior heat exchanger 32 is reduced by the air-conditioning air.

As can be seen from the foregoing description, no matter what operation mode the heat pump device 20 is operating in, the downstream interior heat exchanger 31 always functions as a radiator.

Figure 2:
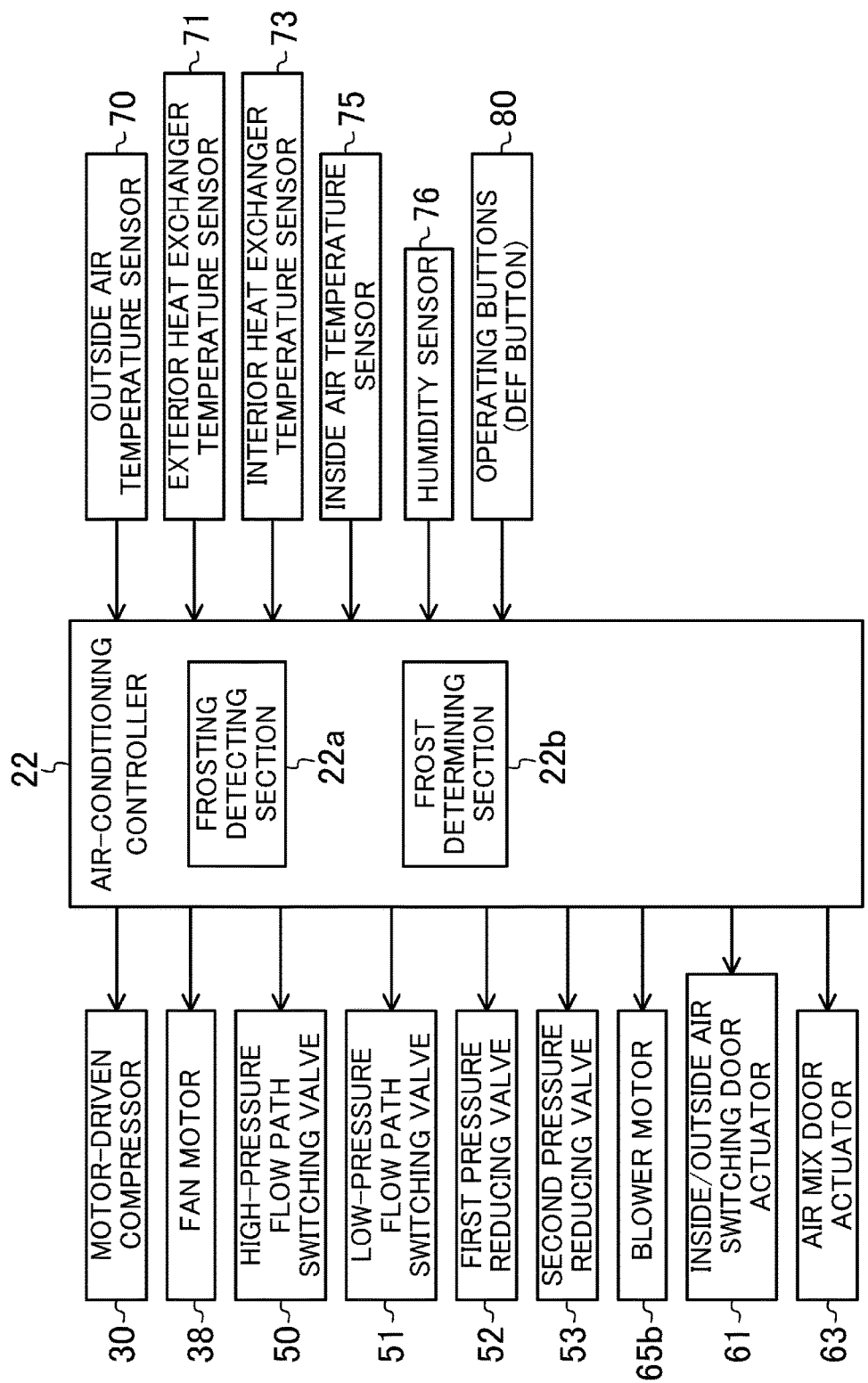
FIG. 2 is a block diagram of a vehicle air conditioner.

As shown in FIG. 2, the air-conditioning controller 22 includes a frosting detecting section 22a which determines whether or not frost has been deposited in the exterior heat exchanger 33. The frosting detecting section 22a decides that frost has been detected if a value obtained by subtracting the surface temperature of the exterior heat exchanger 33 detected by the exterior heat exchanger temperature sensor 71 from the outside air temperature (TG) detected by the outside air temperature sensor 70 is greater than, e.g., 20 (° C.). That is, frosting is detected based on the fact that if frost has been deposited in the exterior heat exchanger 33, the refrigerant cannot absorb heat in the exterior heat exchanger 33 and its temperature does not increase. Thus, the value of "20" may be changed into any other value as long as a determination can be made, based on that value, whether or not frost has been deposited in the exterior heat exchanger 33. Alternatively, deposition of frost may be detected directly.

The air-conditioning controller 22 further includes a frost determining section 22b configured to determine whether or not the upstream interior heat exchanger 32 needs the frost reducing operation. The frost determining section 22b makes a determination based on the surface temperature of the upstream interior heat exchanger 32 detected by the interior heat exchanger temperature sensor 73. For example, if the surface temperature is equal to or lower than −3° C. (that is the frost determination temperature), the frost determining section 22b decides that frost has been deposited in the upstream interior heat exchanger 32 and the frost reducing operation is needed. On the other hand, if the surface temperature is higher than the frost determination temperature, the frost determining section 22b decides that no frost has been deposited there and no frost reducing operation is needed. Note that this frost determination method is only an example and the determination may also be made by any known method as well.

Figure 14:
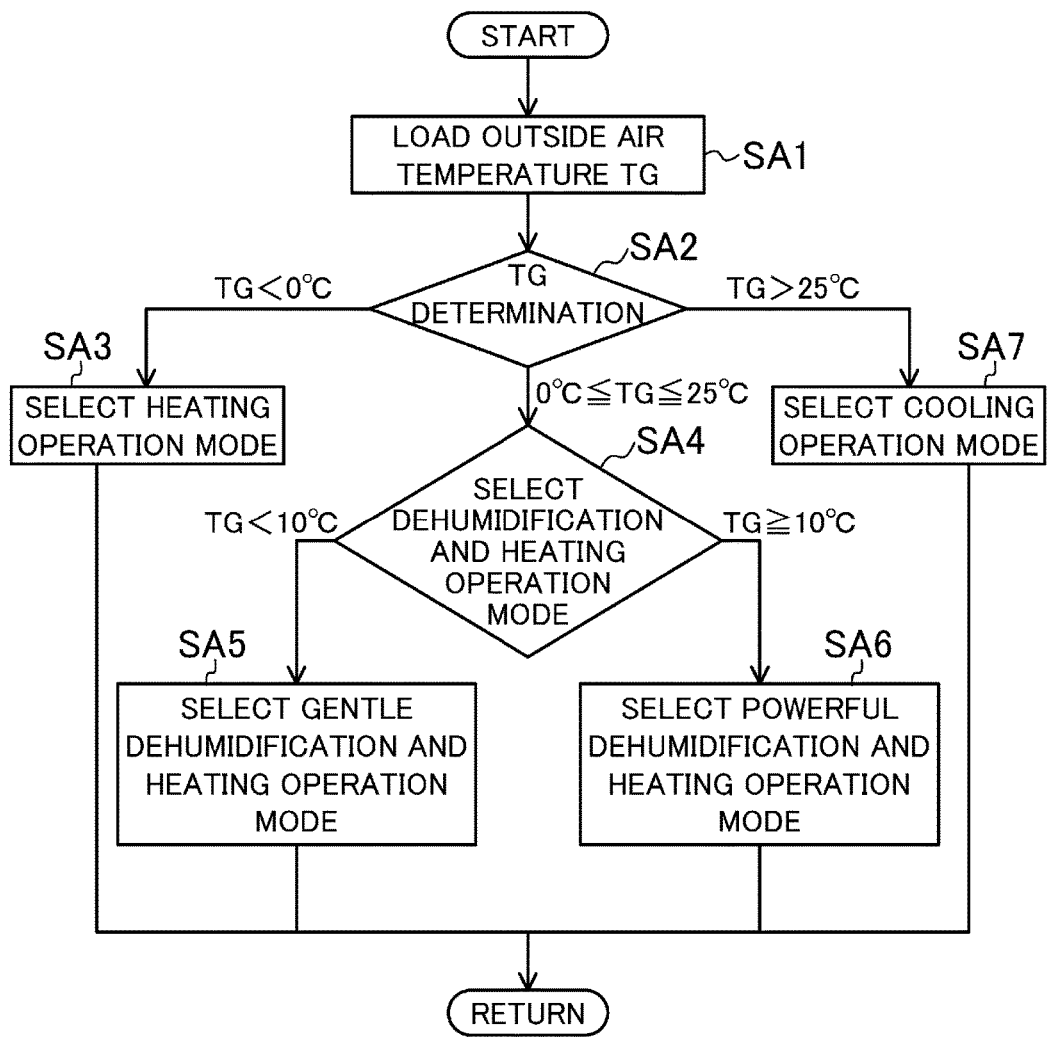
FIG. 14 is a flowchart showing the procedure of a control to be performed by an air-conditioning controller.

Next, the procedure of control to be performed by the air conditioning controller 22 will be described with reference to FIGS. 14-19. FIG. 14 shows the main routine. In Step SA1 after the "START," the outside air temperature (TG) detected by the outside air temperature sensor 70 is loaded. Next, in Step SA2 following Step SA1, a determination is made whether the outside air temperature (TG) is lower than 0° C., equal to or higher than 0° C. and equal to or lower than 25° C., or higher than 25° C. Note that the temperature at which the determination is made does not have to be 0° C. or 25° C. but may also be any other value as long as the object of the present invention is achievable.

If the outside air temperature (TG) has been determined, in Step SA2, to be lower than 0° C., the process proceeds to Step SA3. Then, the operation modes of the heat pump device 20 are switched into the heating operation mode, and the process proceeds to "RETURN" of the main routine. In the heating operation mode, the heat mode is mainly selected as the blowout mode of the interior air-conditioning unit 21. In addition, the air mix door 62 is operated such that the temperature of the blown air reaches a target temperature.

On the other hand, if the outside air temperature (TG) has been determined, in Step SA2, to be equal to or higher than 0° C. and equal to or lower than 25° C., the process proceeds to Step SA4 to perform dehumidification and heating operation mode selection processing. In this description, the "dehumidification and heating operation mode selection processing" refers herein to processing of selecting either the gentle dehumidification and heating operation mode or the powerful dehumidification and heating operation mode. If the outside air temperature (TG) is determined, in Step SA4, to be lower than 10° C., the process proceeds to Step SA5, the operation modes of the heat pump device 20 are switched into the gentle dehumidification and heating operation mode, and the process proceeds to "RETURN" of the main routine. However, if the outside air temperature (TG) is determined, in Step SA4, to be equal to or higher than 10° C., the process proceeds to Step SA6, the operation modes of the heat pump device 20 are switched into the powerful dehumidification and heating operation mode, and the process proceeds to "RETURN" of the main routine. That is to say, if the outside air temperature is lower than 10° C., then the humidity of the air-conditioning air is relatively low and the dehumidifying capacity may be low, and therefore, the gentle dehumidification and heating operation mode may be selected. On the other hand, if the outside air temperature is equal to or higher than 10° C., then the humidity of the air-conditioning air is relatively high and the dehumidifying capacity is suitably high, and therefore, the powerful dehumidification and heating operation mode may be selected.

If the outside air temperature (TG) is determined, in Step SA2, to be higher than 25° C., the process proceeds to Step SA7, the operation modes of the heat pump device 20 are switched into the cooling operation mode, and the process proceeds to "RETURN" of the main routine.

Figure 15:
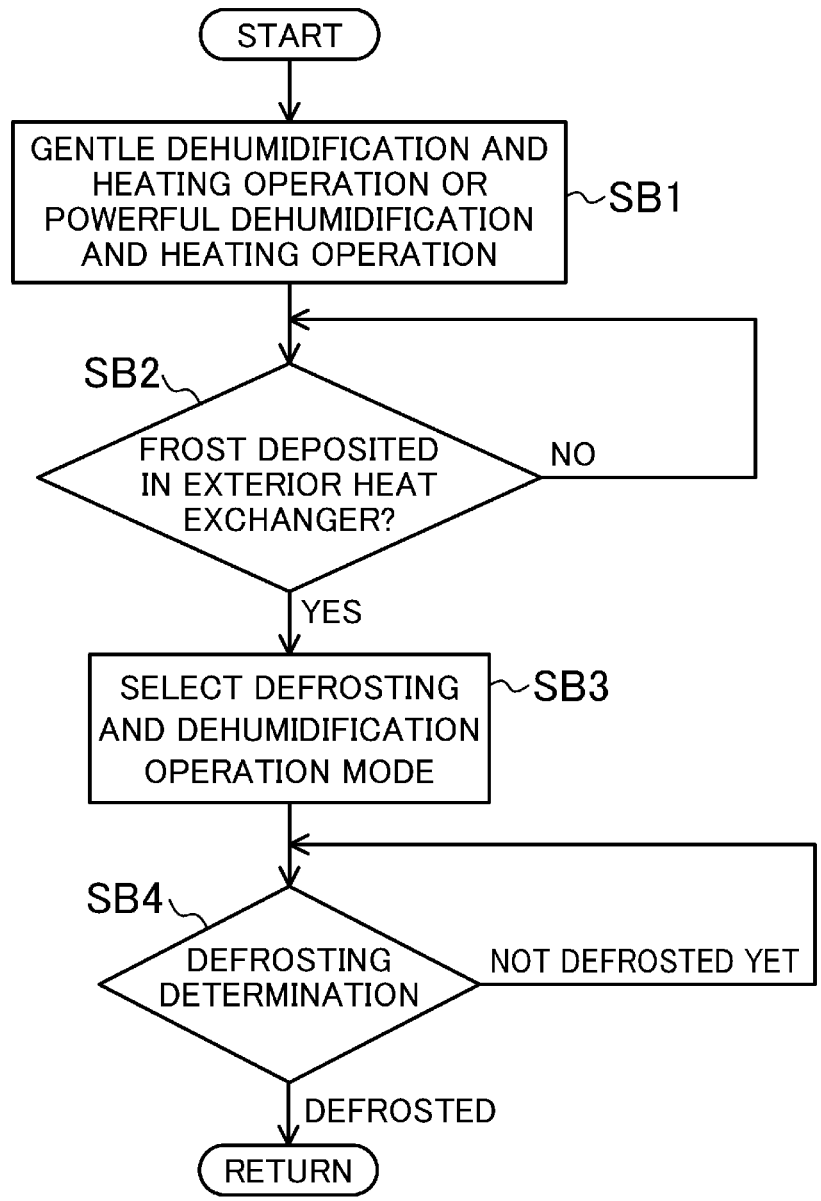
FIG. 15 is a flowchart showing the procedure of a control to be performed during a defrosting operation.

If the process has proceeded to either Step SA5 or Step SA6, the sub-routine control shown in FIG. 15 is performed. The sub-routine control is carried out such that if frost has been deposited in the exterior heat exchanger 33, the operation modes are switched into the defrosting and dehumidification operation mode.

In Step SB1, the operation is continuously performed in either the gentle dehumidification and heating operation mode in Step SA5 of the flowchart shown in FIG. 14 or the powerful dehumidification and heating operation mode in Step SA6. Next, in Step SB2, the frosting detecting section 22a determines whether or not frost has been deposited in the exterior heat exchanger 33. If the answer to the query of the processing step SB2 is NO (i.e., if no frost has been deposited yet in the exterior heat exchanger 33), the dehumidification and heating operation in Step SB1 is continued. On the other hand, if the answer to the query of the processing step SB2 is YES (i.e., the decision has been made that frost has been deposited in the exterior heat exchanger 33), then the process proceeds to Step SB3 to switch the operation modes of the heat pump device 20 into a defrosting and dehumidification operation mode.

In Step SB4, a determination is made about defrosting. This defrosting determination is made by having the frosting detecting section 22a determine, as in Step SB2, whether or not frost has been deposited in the exterior heat exchanger 33. If no frost has been deposited there, the decision is made that defrosting is completed and the process proceeds to RETURN. On the other hand, if any frost is still left, then the decision is made that defrosting is still incomplete and the defrosting and dehumidification operation will be continued until defrosting is completed.

Figure 16:
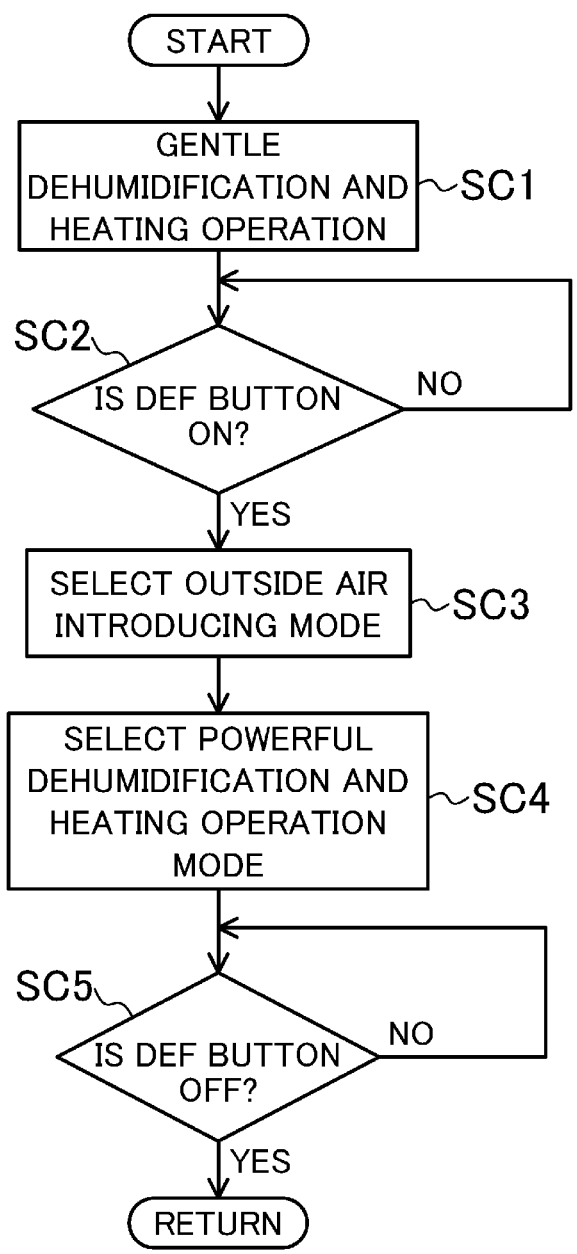
FIG. 16 is a flowchart showing the procedure of a control to be performed when the operation modes are switched from the dehumidification and heating operation mode in response to the occupant's button operations.

If a gentle dehumidification and heating operation mode has been selected in Step SA5 shown in FIG. 14, then the sub-routine control shown in FIG. 16 is performed. This is a control allowing for continuing the gentle dehumidification and heating operation mode if the dehumidifying capacity may be as low as in the gentle dehumidification and heating operation mode and for automatically switching the operation modes into a powerful dehumidification and heating operation mode if the dehumidifying capacity needs to be increased.

In Step SC1, the operation in the gentle dehumidification and heating operation mode in Step SA5 of the flowchart shown in FIG. 14 is performed continuously. Next, in Step SC2, a determination is made whether or not a DEF button to select a defroster blowout mode is ON. If the DEF button is ON, the blowout mode changes into the defroster blowout mode.

If the DEF button is ON, then it means that the occupant wants to defrost the windshield and demands powerful dehumidification. On the other hand, if the answer to the query of the processing step SC2 is NO (i.e., if the occupant does not demand powerful dehumidification), then the gentle dehumidification and heating operation is continued. If the answer to the query of the processing step SC2 is YES (i.e., if the occupant demands powerful dehumidification), then the process proceeds to Step SC3 in which the air introducing modes are switched into an outside air introducing mode. This is done in order to introduce air-conditioning air with lower humidity, because the humidity should be low in the outside air temperature range in which the gentle dehumidification and heating operation mode is selected.

In this processing step SC2, the interior air-conditioning unit 21 functions as a blowout mode detecting means that determines whether or not it works in the defroster blowout mode.

Next, in Step SC4 following the processing step SC3, the operation modes of the heat pump device 20 are switched into the powerful dehumidification and heating operation mode. Then, the dehumidifying capacity increases so much as to defog the windshield quickly.

In Step SC5, a determination is made whether or not the DEF button has been turned OFF. If the DEF button remains ON, the powerful dehumidification and heating operation is continued. On the other hand, if the DEF button has been turned OFF, then the process proceeds to RETURN.

Optionally, timer processing may be performed instead of the processing step SC5. That is to say, the air conditioner may return to the gentle dehumidification and heating operation mode when a predetermined amount of time passes since the operation modes were switched into the powerful dehumidification and heating operation mode.

Figure 17:
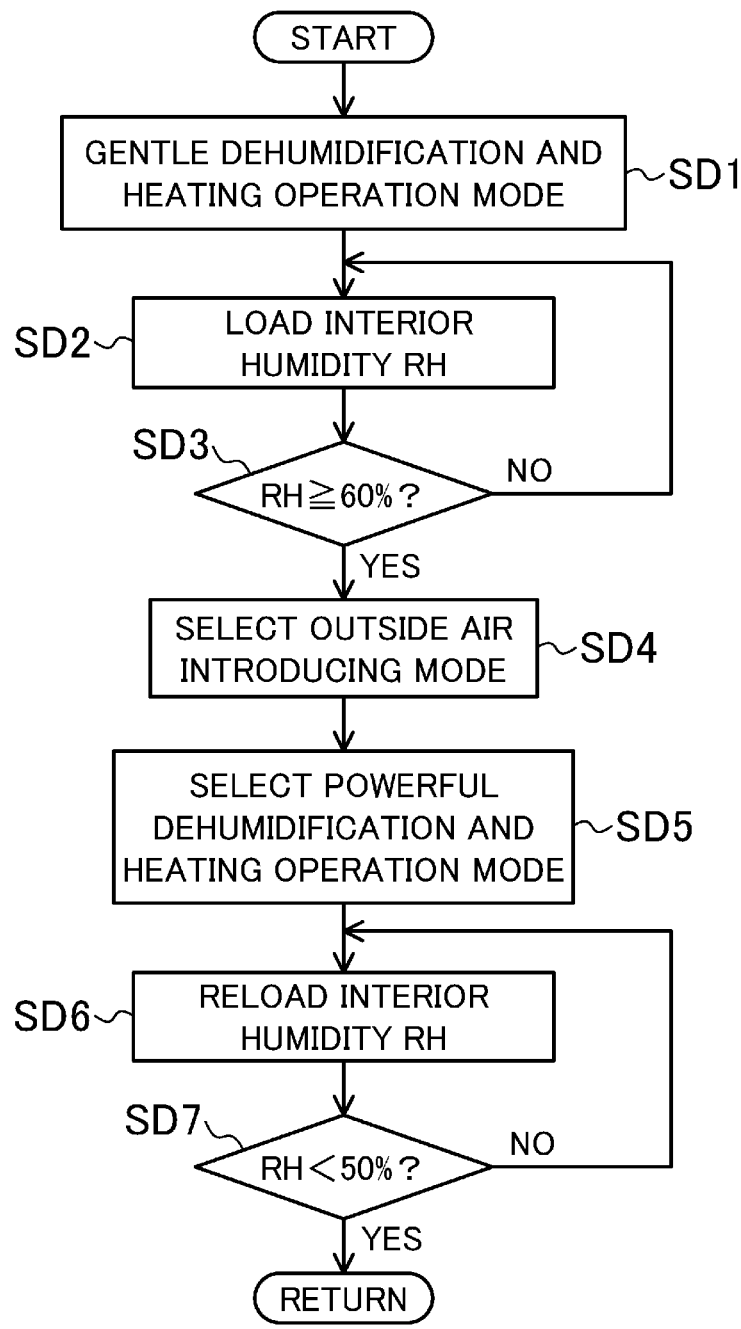
FIG. 17 is a flowchart showing the procedure of a control to be performed when the operation modes are switched from the dehumidification and heating operation mode according to humidity inside a vehicle cabin.

If a gentle dehumidification and heating operation mode has been selected in Step SA5 shown in FIG. 14, then the sub-routine control shown in FIG. 17 is performed. This is a control for automatically changing the dehumidifying capacity according to humidity inside the vehicle cabin.

In Step SD1, the operation in the gentle dehumidification and heating operation mode in Step SA5 of the flowchart shown in FIG. 14 is performed continuously. Next, in Step SD2, the interior humidity (RH) detected by the humidity sensor 76 is loaded.

Next, in Step SD3, a determination is made whether or not the interior humidity (RH) is equal to or higher than 60%. If the interior humidity (RH) has been determined in Step SD3 to be less than 60%, the humidity inside the vehicle cabin is not so high, and therefore, the gentle dehumidification and heating operation is continued. On the other hand, if the interior humidity (RH) has been determined in Step SD3 to be equal to or higher than 60%, then the process proceeds to Step SD4 to switch the air introducing modes into an outside air introducing mode. This is done in order to introduce air-conditioning air with lower humidity.

Subsequently, in Step SD5, the operation modes of the heat pump device 20 are switched into a powerful dehumidification and heating operation mode. Then, the dehumidifying capacity increases so much as to lower the interior humidity.

Thereafter, in Step SD6, the interior humidity (RH) is reloaded. In the next processing step SD7, a determination is made whether or not the interior humidity (RH) is lower than 50%. If the interior humidity (RH) has been determined in Step SD7 to be less than 50%, then the decision is made that the interior humidity has decreased and the process proceeds to RETURN. On the other hand, if the interior humidity (RH) has been determined in Step SD7 to be equal to or higher than 50%, then the powerful dehumidification and heating operation is continued.

Note that the threshold value does not have to be 50% or 60% but may be set to be any other arbitrary value as long as the object of the present invention is achievable.

Figure 18:
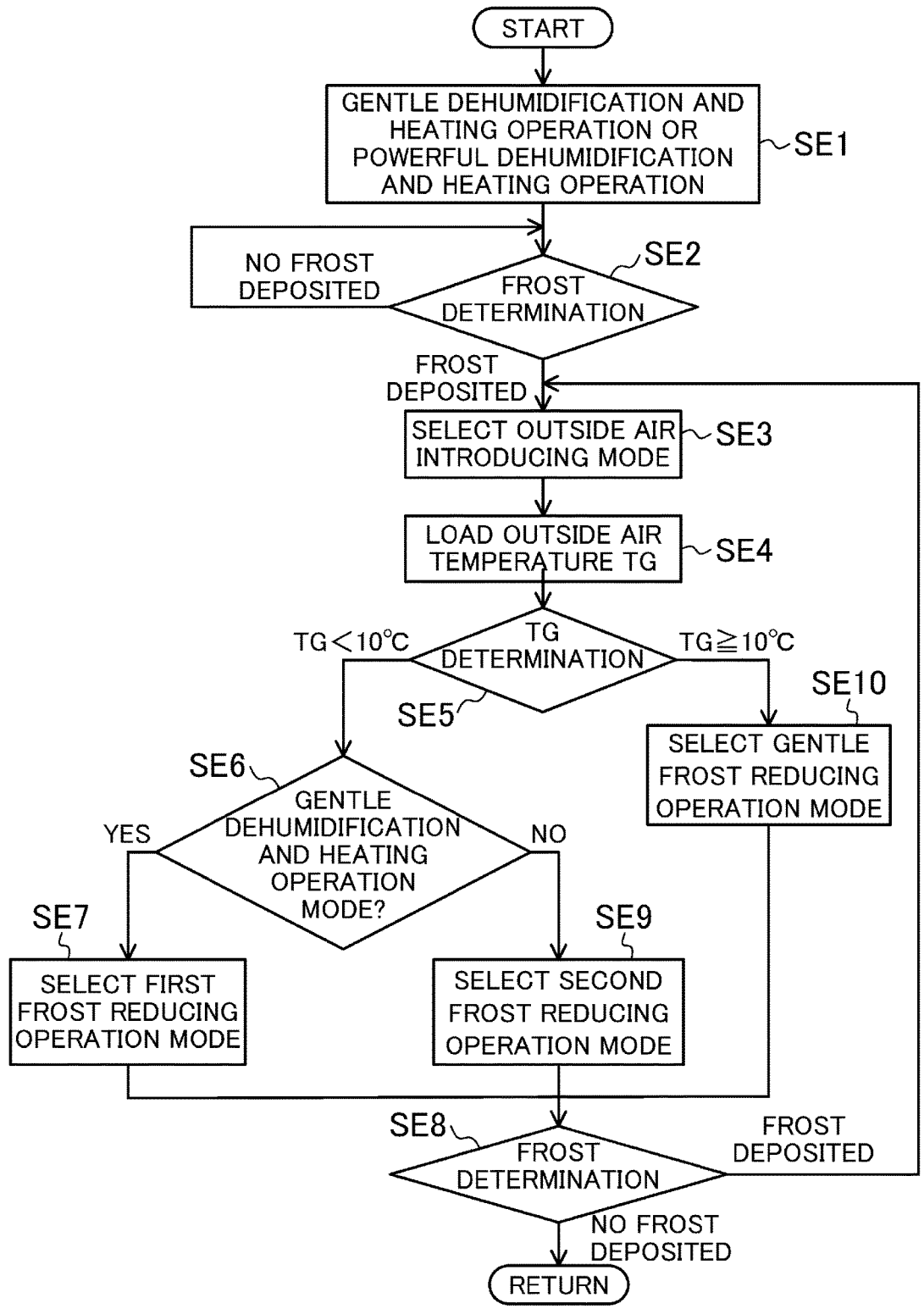
FIG. 18 is a flowchart showing the procedure of a control to be performed when the operation modes are switched from the frost operation mode according to outside air temperature.

If the process has proceeded, in the main routine shown in FIG. 14, to Step SA4 to select any of the dehumidification and heating operation modes, then the sub-routine control of the dehumidification and heating operation mode shown in FIG. 18 is performed. This is a control for reducing frost in the upstream interior heat exchanger 32.

In Step SE1, the operation in the gentle dehumidification and heating operation mode in Step SA5 of the flowchart shown in FIG. 14 and the operation in the powerful dehumidification and heating operation mode in Step SA6 are performed continuously. Next, in Step SE2, the frost determining section 22b determines whether or not a frost reducing operation needs to be performed on the upstream interior heat exchanger 32. If the decision has been made in Step SE2 that no frost has been deposited there and no frost reducing operation needs to be performed on the upstream interior heat exchanger 32, then the dehumidification and heating operation in Step SE1 is continued. On the other hand, if the decision has been made in Step SE2 that frost has been deposited there and a frost reducing operation needs to be performed on the upstream interior heat exchanger 32, then the process proceeds to Step SE3 in which the air introducing modes are switched into the outside air introducing mode. Thereafter, the process proceeds to Step SE4 to load the outside air temperature (TG). After that, the process proceeds to Step SE5 to determine whether the outside air temperature (TG) is lower than 10° C. or equal to or higher than 10° C.

If the outside air temperature (TG) has been determined in Step SE5 to be lower than 10° C., the process proceeds to Step SE6 to determine whether the current operation mode is a gentle dehumidification and heating operation mode or not. If the answer to the query of the processing step SE6 is YES (i.e., if the current operation mode is the gentle dehumidification and heating operation mode), the operation modes of the heat pump device 20 are switched into a first frost reducing operation mode. Next, the process proceeds to Step SE8 to make the same frost determination as in Step SE2. If any frost is still left in the upstream interior heat exchanger 32, the process proceeds to Step SE3. On the other hand, if no frost is left in the upstream interior heat exchanger 32, then the process proceeds to RETURN.

If the answer to the query of the processing step SE6 is NO (i.e., if the current operation mode is the powerful dehumidification and heating operation mode), the process proceeds to Step SE9 to switch the operation modes of the heat pump device 20 into a second frost reducing operation mode. Next, the process proceeds to Step SE8 to make the same frost determination as in Step SE2. If any frost is still left in the upstream interior heat exchanger 32, the second frost reducing operation is performed continuously. On the other hand, if no frost is left in the upstream interior heat exchanger 32, then the process proceeds to RETURN.

Also, if the outside air temperature (TG) turns out to be equal to or higher than 10° C. as a result of the outside air temperature decision in Step SE5, the process proceeds to Step SE10 to switch the operation modes of the heat pump device 20 into a gentle frost reducing operation mode. In the gentle frost reducing operation mode, no refrigerant flows through the upstream interior heat exchanger 32 as shown in FIG. 12. In this case, since the outside air temperature is equal to or higher than 10° C. and the current air introducing mode is the outside air introducing mode, air-conditioning air at a temperature of approximately 10° C. or higher is blown against the upstream interior heat exchanger 32. Due to the temperature of this air-conditioning air, the frost in the upstream interior heat exchanger 32 is reducible.

Note that the threshold temperature does not have to be 10° C. but may also be set to be any other arbitrary value as long as the object of the present invention is achievable.

Next, the process proceeds to Step SE8 to make the same frost determination as in Step SE2. If any frost is still left in the upstream interior heat exchanger 32, the gentle frost reducing operation is performed continuously. On the other hand, if no frost is left in the upstream interior heat exchanger 32, then the process proceeds to RETURN.

Figure 19:
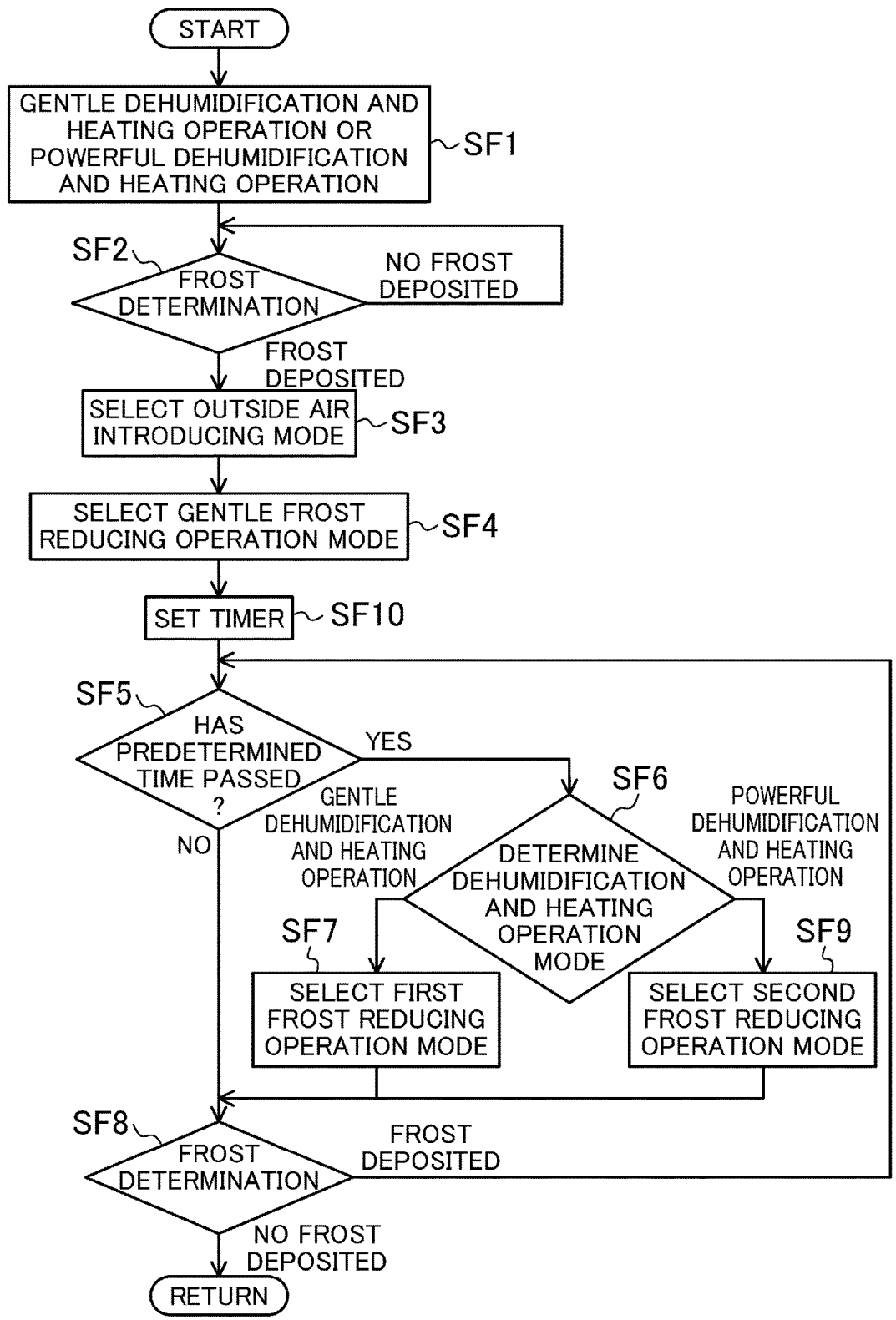
FIG. 19 is a flowchart showing the procedure of another control to be performed when the operation modes are switched from the frost operation mode.

Furthermore, if the process proceeds, in the main routine shown in FIG. 14, to Step SA4 to select the dehumidification and heating operation mode, the sub-routine control in the dehumidification and heating operation mode shown in FIG. 19 may be performed instead of the sub-routine control shown in FIG. 18. This is also a control for reducing frost in the upstream interior heat exchanger 32.

Steps SF1 to SF3 are respectively the same as Steps SE1 to SE3 of the flowchart shown in FIG. 18.

In Step SF4, the operation modes of the heat pump device 20 are switched into a gentle frost reducing operation mode. Then, the process proceeds to Step SF10 to set the timer and then proceeds to Step SF5 to determine whether or not a predetermined amount of time (of, e.g., three to five minutes) has passed since the operation modes of the heat pump device 20 were switched into the gentle frost reducing operation mode. If the answer to the query of Step SF5 is YES (i.e., if the predetermined amount of time has already passed), the process proceeds to Step SF6 to determine whether the mode just before being switched into the gentle frost reducing operation mode was the gentle dehumidification and heating operation mode or the powerful dehumidification and heating operation mode.

If the mode just before being switched into the gentle frost reducing operation mode turns out in Step SF6 to be the gentle dehumidification and heating operation mode, then the process proceeds to Step SF7 to switch the operation modes of the heat pump device 20 into the first frost reducing operation mode. Next, the process proceeds to Step SF8 to make the same frost determination as in Step SF2. If any frost is still left in the upstream interior heat exchanger 32, the process proceeds to Step SF5. On the other hand, if no frost is left in the upstream interior heat exchanger 32, then the process proceeds to RETURN.

If the mode just before being switched into the gentle frost reducing operation mode turns out in Step SF6 to be the powerful dehumidification and heating operation mode, then the process proceeds to Step SF9 to switch the operation modes of the heat pump device 20 into the second frost reducing operation mode. Next, the process proceeds to Step SF8 to make the same frost determination as in Step SF2. If any frost is still left in the upstream interior heat exchanger 32, the second frost reducing operation is performed continuously. On the other hand, if no frost is left in the upstream interior heat exchanger 32, then the process proceeds to RETURN.

That is to say, the air-conditioning controller 22 is configured to operate in the following manner. Specifically, if the decision is made by the frost determining section 22b that the upstream interior heat exchanger 32 needs a frost reducing operation, the air-conditioning controller 22 switches the operation modes of the heat pump device 20 into the gentle frost reducing operation mode and makes the heat pump device 20 perform the gentle frost reducing operation for a predetermined amount of time. Thereafter, if the decision made by the frost determining section 22b remains that the upstream interior heat exchanger 32 still needs the frost reducing operation and if the operation mode just before being switched into the gentle frost reducing operation mode was the gentle dehumidification and heating operation mode, the air-conditioning controller 22 switches the operation modes into the first frost reducing operation mode. On the other hand, if the operation mode just before being switched into the gentle frost reducing operation mode was the powerful dehumidification and heating operation mode, the air-conditioning controller 22 switches the operation modes into the second frost reducing operation mode.

As can be seen from the foregoing description, the vehicle air conditioner 1 according to this embodiment is configured to operate while making a switch between multiple operation modes including a gentle dehumidification and heating operation mode in which a refrigerant discharged from a compressor 30 is circulated through a downstream interior heat exchanger 31, a first pressure reducing valve 52, an upstream interior heat exchanger 32, and an exterior heat exchanger 33 in this order so that the downstream interior heat exchanger 31 functions as a radiator and the upstream interior heat exchanger 32 functions as a heat absorber, and a powerful dehumidification and heating operation mode in which the refrigerant discharged from the compressor 30 is circulated through the downstream interior heat exchanger 31, the second pressure reducing valve 53, the exterior heat exchanger 33, and the upstream interior heat exchanger 32 in this order so that the downstream interior heat exchanger 31 functions as a radiator and the upstream interior heat exchanger 32 functions as a heat absorber.

That is to say, during the gentle dehumidification and heating operation mode, a high-temperature, high-pressure refrigerant discharged from the compressor 30 is supplied to the downstream interior heat exchanger 31. On the other hand, a refrigerant which has had its pressure reduced by the first pressure reducing valve 52 is supplied to the upstream interior heat exchanger 32. The upstream interior heat exchanger 32 is arranged upstream in the airflow direction and the downstream interior heat exchanger 31 is arranged downstream of the upstream interior heat exchanger 32. Thus, the air that has been dehumidified by the upstream interior heat exchanger 32 is heated by the downstream interior heat exchanger 31 and then supplied to the vehicle cabin.

Likewise, during the powerful dehumidification and heating operation mode, the downstream interior heat exchanger 31 also functions as a radiator and the upstream interior heat exchanger 32 also functions as a heat absorber. However, since the upstream interior heat exchanger 32 is supplied with a refrigerant that has circulated through the exterior heat exchanger 33, the upstream interior heat exchanger 32 comes to have a lower evaporating pressure than the exterior heat exchanger 33. Thus, a larger quantity of heat is absorbed than in the gentle dehumidification and heating operation mode. As a result, in the powerful dehumidification and heating operation mode, the dehumidifying capacity becomes higher than in the gentle dehumidification and heating operation mode.

Meanwhile, in both of the gentle and powerful dehumidification and heating operation modes, the high-temperature, high-pressure refrigerant discharged from the compressor 30 is supplied to the downstream interior heat exchanger 31, which is arranged downstream in the airflow direction. This thus allows for heating the air-conditioning air sufficiently.

Consequently, the dehumidifying capacity is controllable appropriately with a sufficient heating capacity ensured during the dehumidification and heating operation.

Also, if frost has been deposited in the exterior heat exchanger 33, the operation modes are switched into a defrosting and dehumidification operation mode so that the refrigerant discharged from the compressor 30 flows while bypassing the exterior heat exchanger 33. This thus allows for melting the frost in the exterior heat exchanger 33 efficiently using the outside air.

Furthermore, the first pressure reducing valve 52 is provided for a pipe connected to a refrigerant inlet side of the upstream interior heat exchanger 32, and the second pressure reducing valve 53 is provided for a pipe connected to a refrigerant inlet side of the exterior heat exchanger 33. This thus allows for causing the refrigerant in the upstream interior heat exchanger 32 to have an intermediate pressure during the gentle dehumidification and heating operation mode and causing the refrigerant in the exterior heat exchanger 33 to have an intermediate pressure during the powerful dehumidification and heating operation mode. Consequently, the dehumidifying capacity is controllable finely.

Moreover, since the degrees of pressure reduction at the first and second pressure reducing valves 52 and 53 are adjustable by the air-conditioning controller 22, the operating pressures of the upstream interior heat exchanger 32 and exterior heat exchanger 33 may be regulated. Consequently, the dehumidifying capacity is controllable finely.

On top of that, the first and second pressure reducing valves 52 and 53 are controllable according to the temperature of a portion of the upstream interior heat exchanger 32 downstream in the airflow direction. Consequently, the dehumidifying capacity is controllable accurately according to the current degree of dehumidification.

Besides, if the blowout mode is the defroster blowout mode, the heat pump device 20 is made to operate in the powerful dehumidification and heating operation mode, thus allowing for defogging the windshield quickly.

Furthermore, a vehicle air conditioner 1 according to this embodiment sets gentle and powerful dehumidification and heating operation modes with mutually different dehumidifying capacities. A first frost reducing mode of operation is performed during the gentle dehumidification and heating operation mode, while a second frost reducing mode of operation with a different frost reducing capacity from the first frost reducing mode of operation is performed during the powerful dehumidification and heating operation mode. This thus allows for performing a frost reducing operation efficiently when the heat pump device 20 is operated with its dehumidifying capacity controlled according to the degree of dehumidification required.

In addition, in the first frost reducing operation mode, the temperature of the refrigerant flowing into the exterior heat exchanger 33 is decreased to absorb heat and raise the temperature of the refrigerant flowing into the upstream interior heat exchanger 32. Thus, frost is reduced effectively in the upstream interior heat exchanger 32.

Meanwhile, in the second frost reducing operation mode, heat is absorbed by the exterior heat exchanger 33 so that a superheated refrigerant flows into the upstream interior heat exchanger 32. Thus, frost is reduced effectively in the upstream interior heat exchanger 32.

Furthermore, a gentle frost reducing mode of operation is performed in which the refrigerant is allowed to flow while bypassing the upstream interior heat exchanger 32, thus allowing for reducing frost in the upstream interior heat exchanger 32 while maintaining comfortableness without steeply raising the humidity inside the vehicle cabin.

Furthermore, when a frost reducing operation needs to be performed on the upstream interior heat exchanger 32, a gentle frost reducing mode of operation is performed in which the refrigerant is allowed to flow while bypassing the upstream interior heat exchanger 32, thus allowing for reducing frost in the upstream interior heat exchanger 32 while maintaining comfortableness without steeply raising the humidity inside the vehicle cabin. If a frost reducing operation needs to be further performed after that, a more powerful frost reducing mode of operation may be performed continuously according to the previous dehumidification and heating operation mode. This ensures that the upstream interior heat exchanger 32 has its frost reduced successfully.

In the embodiments described above, the high- and low-pressure flow path switching valves 50 and 51 of the heat pump device 20 are both configured as three-way valves. However, either or both of the valves 50 and 51 may be a combination of two on-off valves. Any flow path switching means may be used without particular limitation.

Also, in the embodiments described above, the vehicle air conditioner 1 is supposed to be mounted on an electric vehicle. However, this is only an example of the present invention. The vehicle air conditioner 1 may also be mounted on various other types of automobiles such as a hybrid car including an engine and a traction motor.

Note that each and every embodiment described above is just an example in any respects and should not be construed to be a limiting one. Besides, any variations or modifications falling within the range of equivalents to the claims to be described below are all encompassed within the scope of the present invention.

As can be seen from the foregoing description, a vehicle air conditioner according to the present invention may be mounted on electric vehicles and hybrid vehicles, for example.

The invention claimed is:

1. A vehicle air conditioner comprising:
   a heat pump device including a compressor that compresses a refrigerant, a first interior heat exchanger provided inside a vehicle cabin, a second interior heat exchanger provided inside the vehicle cabin and upstream of the first interior heat exchanger in an airflow direction, an exterior heat exchanger provided outside the vehicle cabin, first and second pressure reducing valves, and a flow path switching valve that switches flow paths of the refrigerant such that the refrigerant that has flowed out of the first interior heat exchanger flows toward the first pressure reducing valve or the second pressure reducing valve, the heat pump device being formed by connecting together the compressor, the first and second interior heat exchangers, the pressure reducing valves, the flow path switching valve, and the exterior heat exchanger via refrigerant piping;

an interior air-conditioning unit which houses the first and second interior heat exchangers and which includes a blower that blows air-conditioning air to the first and second interior heat exchangers, the interior air-conditioning unit being configured to produce conditioned air and supply the conditioned air into the vehicle cabin; and an air-conditioning controller configured to control the heat pump device and the interior air-conditioning unit, wherein the air-conditioning controller makes the heat pump device operate while making a switch between multiple operation modes including a first dehumidification and heating operation mode in which a refrigerant discharged from the compressor is circulated through the first interior heat exchanger, the first pressure reducing valve, the second interior heat exchanger, and the exterior heat exchanger in this order so that the first interior heat exchanger functions as a radiator and the second interior heat exchanger functions as a heat absorber, and a second dehumidification and heating operation mode in which the refrigerant discharged from the compressor is circulated through the first interior heat exchanger, the second pressure reducing valve, the exterior heat exchanger, and the second interior heat exchanger in this order so that the first interior heat exchanger functions as a radiator and the second interior heat exchanger functions as a heat absorber.

2. The vehicle air conditioner of claim 1, comprising
a frost deposition detector for detecting deposition of frost in the exterior heat exchanger, wherein
when the frost deposition detector senses that frost has been deposited in the exterior heat exchanger, the air-conditioning controller switches the operation modes of the heat pump device into a defrosting and dehumidification operation mode in which the refrigerant discharged from the compressor is circulated through the first interior heat exchanger, the first pressure reducing valve, and the second interior heat exchanger in this order while bypassing the exterior heat exchanger.

3. The vehicle air conditioner of claim 1, wherein
the first pressure reducing valve is configured to have the ability to reduce pressure to varying degrees and provided for a pipe connected to a refrigerant inlet side of the second interior heat exchanger, and
the second pressure reducing valve is configured to have the ability to reduce pressure to varying degrees and provided for a pipe connected to a refrigerant inlet side of the exterior heat exchanger.

4. The vehicle air conditioner of claim 3, wherein
the first and second pressure reducing valves are controlled by the air-conditioning controller, and
the air-conditioning controller is configured to regulate an operating pressure of the second interior heat exchanger by adjusting the degree of reduction in pressure at the first pressure reducing valve during the first dehumidification and heating operation mode, and to regulate an operating pressure of the exterior heat exchanger by adjusting the degree of reduction in pressure at the second pressure reducing valve during the second dehumidification and heating operation mode.

5. The vehicle air conditioner of claim 4, comprising
a temperature detector for detecting a temperature of the second interior heat exchanger downstream in the airflow direction, wherein
the air-conditioning controller is configured to control the first and second pressure reducing valves based on the temperature of the second interior heat exchanger that has been detected by the temperature detector downstream in the airflow direction.

6. The vehicle air conditioner of claim 1, wherein
the interior air-conditioning unit is configured to have a plurality of blowout modes including a defroster blowout mode in which conditioning air is blown to a windshield inside the vehicle cabin, and
the air conditioner comprises a blowout mode detector for determining whether or not the interior air-conditioning unit is operating in the defroster blowout mode, and
if the blowout mode detector has sensed the interior air-conditioning unit operating in the defroster blowout mode, the air-conditioning controller makes the heat pump device operate in the second dehumidification and heating operation mode.

* * * * *